(12) United States Patent
Amano et al.

(10) Patent No.: US 11,226,612 B2
(45) Date of Patent: Jan. 18, 2022

(54) PRODUCT MANUFACTURING SYSTEM, MALWARE DETECTION SYSTEM, PRODUCT MANUFACTURING METHOD, AND MALWARE DETECTION METHOD

(71) Applicant: Panasonic Intellectual Property Management Co., Ltd., Osaka (JP)

(72) Inventors: Hiroshi Amano, Osaka (JP); Yosuke Tajika, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 246 days.

(21) Appl. No.: 16/343,269

(22) PCT Filed: Oct. 20, 2017

(86) PCT No.: PCT/JP2017/037932
§ 371 (c)(1),
(2) Date: Apr. 18, 2019

(87) PCT Pub. No.: WO2018/079424
PCT Pub. Date: May 3, 2018

(65) Prior Publication Data
US 2019/0317483 A1    Oct. 17, 2019

(30) Foreign Application Priority Data

Oct. 24, 2016  (JP) ............................ JP2016-207796
Oct. 24, 2016  (JP) ............................ JP2016-208064

(51) Int. Cl.
*G05B 19/00*   (2006.01)
*G05B 19/418*  (2006.01)
*H04L 29/06*   (2006.01)

(52) U.S. Cl.
CPC ..... *G05B 19/41835* (2013.01); *G05B 19/4184* (2013.01); *G05B 19/4188* (2013.01); *G05B 19/41885* (2013.01); *H04L 63/1441* (2013.01)

(58) Field of Classification Search
None
See application file for complete search history.

(56) References Cited

U.S. PATENT DOCUMENTS

2001/0051886 A1   12/2001  Mitsutake et al.
2003/0023418 A1*   1/2003  Kikuchi ................. G06Q 10/04
                                                   703/6

(Continued)

FOREIGN PATENT DOCUMENTS

CN   1347054      5/2002
CN   101995880    3/2011

(Continued)

OTHER PUBLICATIONS

International Search Report (ISR) dated Jan. 23, 2018 in International (PCT) Application No. PCT/JP2017/037932.

(Continued)

*Primary Examiner* — Paul B Yanchus, III
(74) *Attorney, Agent, or Firm* — Wenderoth, Lind & Ponack, L.L.P.

(57) ABSTRACT

Provided is a product manufacturing system including: a manufacture control apparatus configured to hold manufacturing data on a product; a virtual manufacturing apparatus configured to virtually manufacture the product by simulation, based on the manufacturing data on the product in the manufacture control apparatus; a physical manufacturing apparatus configured to physically manufacture the product based on the manufacturing data in the manufacture control apparatus; an abnormality determination unit configured to determine whether there is an abnormality in the virtual manufacture of the product by the virtual manufacturing (Continued)

apparatus. When it is determined there is no abnormality from the virtual manufacture of the product, the physical manufacturing apparatus physically manufactures the product.

14 Claims, 17 Drawing Sheets

(56) References Cited

U.S. PATENT DOCUMENTS

| | | | |
|---|---|---|---|
| 2005/0010492 | A1 | 1/2005 | Mitsutake et al. |
| 2007/0248937 | A1* | 10/2007 | Chen .................. G09B 19/0069 434/118 |
| 2012/0209411 | A1 | 8/2012 | Ohkado et al. |
| 2015/0205966 | A1* | 7/2015 | Chowdhury .......... G06F 21/577 726/23 |
| 2017/0232515 | A1* | 8/2017 | DeMuth ................. B33Y 50/02 419/53 |
| 2019/0243977 | A1* | 8/2019 | Aguiar .................. G05B 19/05 |

FOREIGN PATENT DOCUMENTS

| | | |
|---|---|---|
| JP | 5-46371 | 2/1993 |
| JP | 2007-157065 | 6/2007 |
| JP | 2012-168755 | 9/2012 |
| JP | 2014-63349 | 4/2014 |
| JP | 5689333 | 3/2015 |
| JP | 5898024 | 4/2016 |
| WO | 2016/092962 | 6/2016 |

OTHER PUBLICATIONS

Electronic Signature and Authentication Handbook Ver. 2.0, JIPDEC, Electronic Signature and Authentication Promotion Center, Mar. 2007, pp. 1-14 (with partial English translation).

Office Action and Search Report dated Aug. 4, 2021 in corresponding Chinese Patent Application No. 201780064656.1, with English translation of the Search Report.

* cited by examiner

PRODUCT MANUFACTURING SYSTEM, MALWARE DETECTION SYSTEM, PRODUCT MANUFACTURING METHOD, AND MALWARE DETECTION METHOD

TECHNICAL FIELD

The present disclosure relates to a product manufacturing system, a malware detection system, a product manufacturing method, and a malware detection method.

BACKGROUND ART

Recent years have seen active initiatives aiming to improve productivity, create new value, and produce new business models by connecting with things or services both in and out of factories over a communications network such as the internet.

On the other hand, cyber attacks via, e.g., hacking or malware, are becoming more frequent on the internet. Cyber attacks of hacking and stealing information increase with each passing year. Factories have been targeted as well; cases of manufacturing data being altered via unauthorized manipulation, leading to the manufacture of defective goods, halting of manufacturing equipment, and damage of equipment have been reported. Accordingly, there is a need to increase the level of security in factories.

Patent Literature (PTL) 1 is one example of patent literature that discloses a technique for detecting an abnormality in a network. The abnormality detection system according to PTL 1 includes control systems (one example of the manufacturing system), monitoring units, and a management unit.

The control systems are connected to a network, and operate in individual protected areas. The monitoring units are provided for each of the control systems. The monitoring unit in one control system inspects data exchanged between another monitoring unit that it is monitoring, and transmits an abnormality notification when it suspects there is an abnormality in the control system it is monitoring. The management unit collects abnormality notifications transmitted from the monitoring units in the control systems, evaluates the reputations of the control systems suspected of including an abnormality, and when there is determined to be an abnormality after comparing the evaluation result with reference criteria, restricts at least outbound traffic from the protected area in which the control system suspected of including an abnormality is operating.

In this abnormality detection system, control systems suspected of including an abnormality are efficiently detected, and control systems confirmed to include an abnormality are isolated.

CITATION LIST

Patent Literature

[PTL 1]: Japanese Patent No. 5689333
[PTL 2]: Japanese Patent No. 5898024
[PTL 3]: WO2016/092962

SUMMARY OF THE INVENTION

Technical Problems

However, in order to implement the conventional abnormality detection system, the existing manufacturing system needs to be significantly modified. One conceivable option is to change the existing components in the manufacturing system so that the manufacturing data is not altered. However, in a typical factory manufacturing system, the system is used for a long period of time, over which encryption technology used to ensure security becomes outdated, and the code bit length used becomes insufficient.

The present disclosure was conceived to overcome such problems and has an object to provide a product manufacturing system, a malware detection system, a product manufacturing method, and a malware detection method capable of detecting an abnormality in manufacturing data without needing to significantly modify an existing manufacturing system.

Solutions to Problems

In order to achieve the above-described object, a product manufacturing system according to one aspect of the present disclosure is one that manufactures a product, and includes: a manufacture control apparatus configured to hold manufacturing data on the product; a virtual manufacturing apparatus configured to virtually manufacture the product by simulation, based on the manufacturing data on the product held in the manufacture control apparatus; a physical manufacturing apparatus configured to physically manufacture the product based on the manufacturing data held in the manufacture control apparatus; and an abnormality determination unit configured to determine whether there is an abnormality in the virtual manufacture of the product by the virtual manufacturing apparatus. When the abnormality determination unit determines there to be no abnormality from the virtual manufacture of the product, the physical manufacturing apparatus physically manufactures the product.

Moreover, in order to achieve the above-described object, a malware detection system according to one aspect of the present disclosure is one that detects malware that causes a malfunction in the physical manufacturing apparatus that physically manufactures the product, and includes: the product manufacturing system; and a malware determination apparatus configured to determine potential malware to be malware when, in a state in which at least one of the virtual manufacturing apparatus and the manufacture control apparatus is infected with the potential malware, an abnormality is detected from the virtual manufacture of the product by the virtual manufacturing apparatus based on the manufacturing data.

Moreover, in order to achieve the above described object, a product manufacturing method for manufacturing a product includes: virtually manufacturing the product by simulation, based on manufacturing data on the product; determining whether there is an abnormality in the virtual manufacturing of the product; and physically manufacturing the product based on the manufacturing data when the determining determines there to be no abnormality from the virtual manufacturing of the product.

Moreover, in order to achieve the above-described object, a malware detection method for detecting malware that causes a malfunction in a physical manufacturing apparatus that physically manufactures a product, includes: virtually manufacturing the product by simulation via the virtual manufacturing apparatus, based on manufacturing data on the product; and determining potential malware to be malware when an abnormality is detected from the virtual manufacturing of the product in a state in which at least one of the virtual manufacturing apparatus and a manufacture control apparatus that transmits the manufacturing data to the virtual manufacturing apparatus is infected with the potential malware.

Advantageous Effect of Invention

According to the present disclosure, it is possible to detect an abnormality in manufacturing data without having to significantly modify an existing manufacturing system.

DESCRIPTION OF EXEMPLARY EMBODIMENTS

The following describes embodiments with reference to the drawings. The embodiments described below each show a preferred, specific example of the present disclosure. The numerical values, shapes, materials, elements, the arrangement and connection of the elements, etc., indicated in the following embodiments are mere examples, and therefore do not intend to limit the present disclosure. Therefore, among elements in the following embodiments, those not recited in any of the broadest, independent claims are described as optional elements.

Moreover, "approximately" means, for example in the case of "approximately the same," not only exactly the same, but what would be recognized as essentially the same as well.

Note that the respective figures are schematic diagrams and are not necessarily precise illustrations. Additionally, components that are essentially the same share like reference signs in the figures. Accordingly, overlapping explanations thereof are omitted or simplified.

Hereinafter, the product manufacturing system, malware detection system, product manufacturing method, and malware detection method according to embodiments of the present disclosure will be described.

Embodiment 1

Configuration

First, the configuration of product manufacturing system 10 according to this embodiment will be described with reference to FIG. 1 and FIG. 2.

Figure 1:
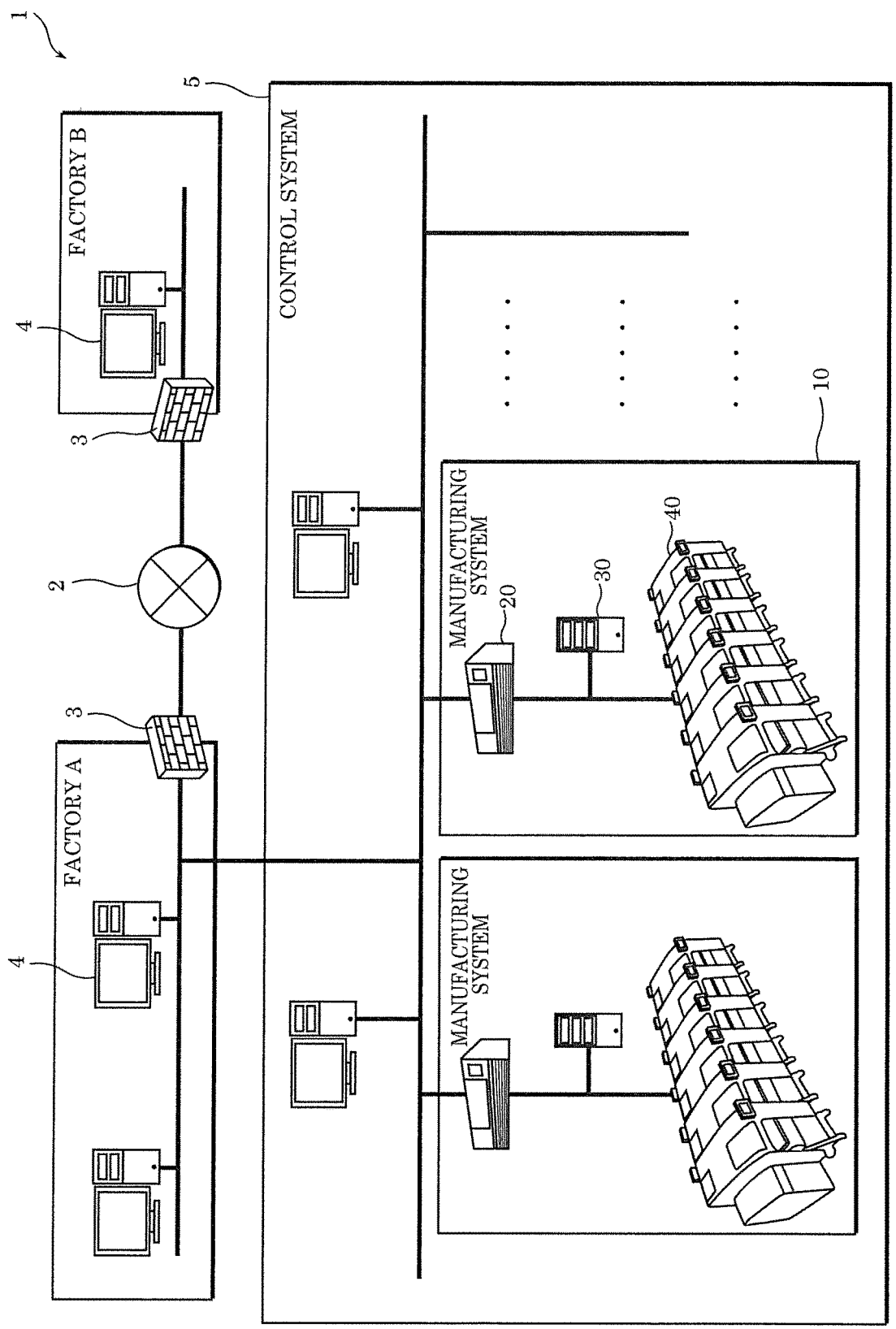
FIG. 1 schematically illustrates an industrial system including a product manufacturing system according to Embodiment 1.
Figure 2:
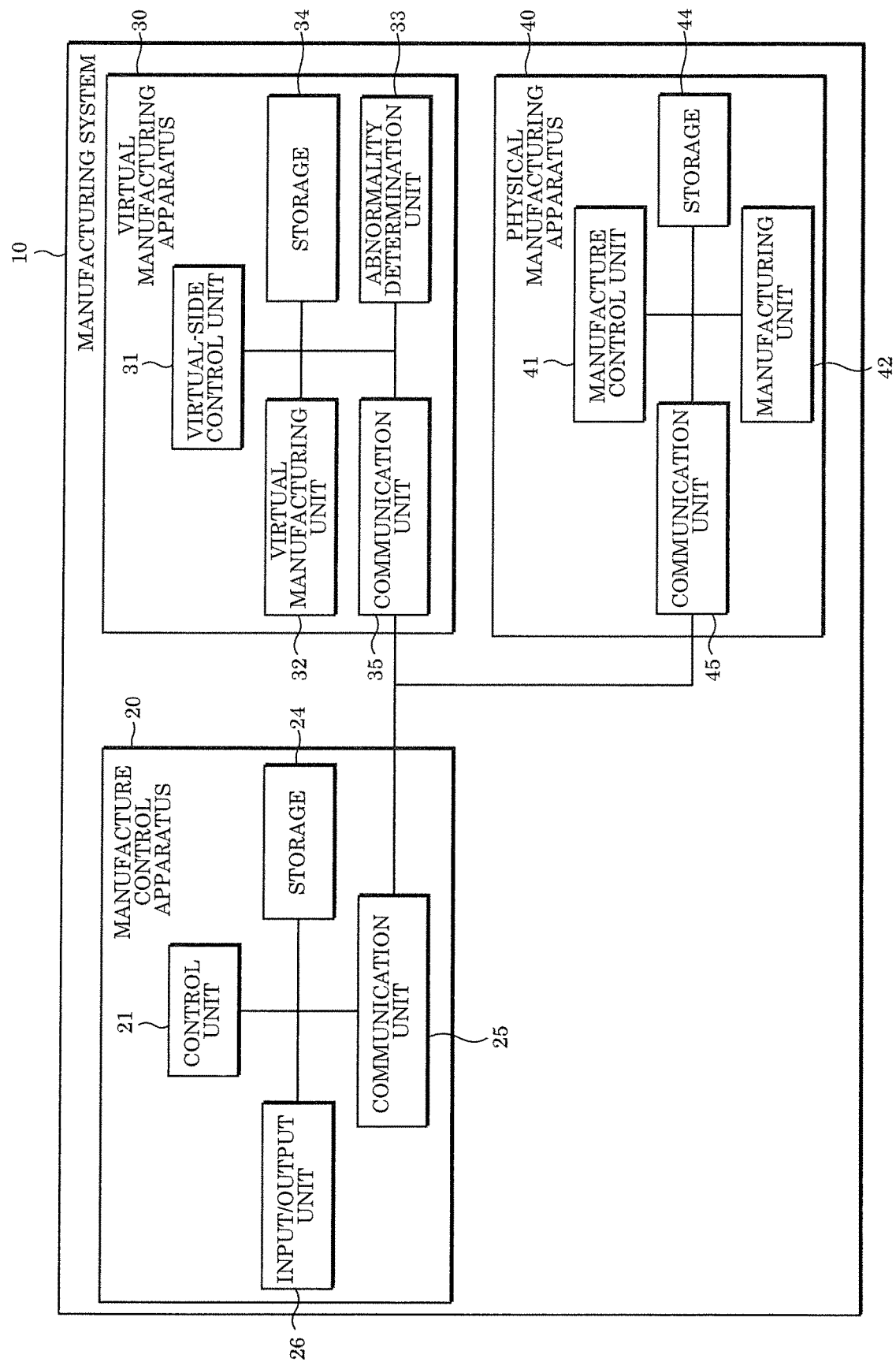
FIG. 2 is a block diagram of the product manufacturing system according to Embodiment 1.

FIG. 1 schematically illustrates industrial system 1 including product manufacturing system 10 according to Embodiment 1. FIG. 2 is a block diagram of product manufacturing system 10 according to Embodiment 1. Hereinafter, product manufacturing system 10 is also referred to simply as "manufacturing system 10".

As illustrated in FIG. 1, industrial system 1 is connected to external network 2, and includes firewalls 3, a plurality of terminal devices 4, and control system 5. Industrial system 1 is, for example, an industrial system relating to the manufacture of electronic components or the like. In this embodiment, factory A and factory B each include firewall 3 and a plurality of terminal devices 4.

Firewall 3 is provided between external network 2 and terminal devices 4, and prevents unauthorized access and the infiltration of viruses (malware) from external network 2. Note that a gateway server may be provided between external network 2 and terminal devices 4 that receives a certificate from an external terminal device 4, and after authentication, transmits, for example, a network application or an encryption scheme table to the external terminal device 4. Here, malware is a generic term for software or code that executes an unauthorized and harmful operation, and includes both intentionally and unintentionally malicious software and code.

Terminal device 4 is, for example, a server provided in a factory or office, and communicates with and collects data from control system 5 over a network. This data may include control data and an operation result parameter, for example.

Control system 5 includes functions appropriate for its application in industrial system 1, and, for example, monitors a production line, controls processes on a production line, and transmits information, such as manufacturing data, to terminal device 4. Control system 5 includes manufacturing system 10 that manufactures a virtual product based on manufacturing data, and if the manufacturing data is normal, manufactures a physical product based on the manufacturing data. Manufacturing data is data based on which a product is manufactured. Examples of manufacturing data include data related to the arrangement of components, data related to the positions of components on a substrate, data related to image recognition, and trajectory data for parts of a machine when operating. In other words, manufacturing data is a broad term that refers to any data used in manufacturing.

Manufacturing system 10 includes at least one manufacture control apparatus 20, at least one virtual manufacturing apparatus 30, and at least one manufacturing apparatus 40. Manufacture control apparatus 20, virtual manufacturing apparatus 30, and physical manufacturing apparatus 40 are communicably connected to one another over a network.

Manufacture Control Apparatus

Manufacture control apparatus 20 is, for example, a manufacturing line controller that controls a manufacturing line, and stores manufacturing data. Manufacture control apparatus 20 can communicate with virtual manufacturing apparatus 30 and physical manufacturing apparatus 40, and transmits newly input product manufacturing data to virtual manufacturing apparatus 30 and physical manufacturing apparatus 40. For example, manufacture control apparatus 20 transmits control information for the starting and stopping of manufacturing to virtual manufacturing apparatus 30 and physical manufacturing apparatus 40, and receives, for example, operation result parameters in virtual manufacturing apparatus 30 and physical manufacturing apparatus 40, from virtual manufacturing apparatus 30 and physical manufacturing apparatus 40. An operation result parameter is information on a manufacturing process. For example, when virtual manufacturing apparatus 30 is a virtual component mounting apparatus, an operation result parameter is at least one of: coordinates at which the component mounting apparatus is to mount a component on a substrate; an orientation in which the component mounting apparatus is to mount the component on the substrate: a type of the component to be mounted by the component mounting apparatus and a type of the substrate; a rotational speed of the component mounting apparatus; a velocity of the component mounting apparatus; a voltage of the component mounting apparatus; a current of the component mounting apparatus; and a temperature of the component mounting apparatus. Moreover, an operation result parameter is not limited to such information on a manufacturing process. For example, operation result parameters include information related to a product virtually manufactured by virtual manufacturing apparatus 30, such as information indicating the size, shape, design, and/or weight of the product, and/or the arrangement of components included in the product. The same applies to operation result parameters in physical manufacturing apparatus 40. Note that manufacture control apparatus 20 may transmit, for example, operation result parameters received from virtual manufacturing apparatus 30 and physical manufacturing apparatus 40 to terminal devices 4 in factory A as well.

Manufacture control apparatus 20 includes control unit 21, storage 24, communication unit 25, and input/output unit 26.

Control unit 21 manages, for example, storage 24, communication unit 25, and input/output unit 26. Control unit 21 transmits, for example, control information indicating, e.g., the starting and stopping of manufacturing, and manufacturing data to virtual manufacturing apparatus 30 and physical manufacturing apparatus 40 via communication unit 25. Control unit 21 stores, for example, manufacturing data and operation result parameters received from virtual manufacturing apparatus 30 and physical manufacturing apparatus 40 in storage 24. Control unit 21 implements these operations by way of a processor or a microcomputer or dedicated hardware.

In addition to transmitting control information for the starting and stopping of manufacturing to virtual manufacturing apparatus 30 and physical manufacturing apparatus 40 via communication unit 25, control unit 21 also successively transmits control signals for controlling operations, such as mounting components on a substrate, to virtual manufacturing apparatus 30 and physical manufacturing apparatus 40 via communication unit 25. Virtual manufacturing apparatus 30 successively transmits information on, for example, the locations of components to be mounted, to manufacture control apparatus 20.

Storage 24 is a storage device that stores, for example, normal manufacturing data, newly input product manufacturing data, and operation result parameters. Normal manufacturing data is data based on which a desired product can be manufactured via predetermined operations when input into physical manufacturing apparatus 40, and is data that does not cause physical manufacturing apparatus 40 to manufacture defective goods, cause manufacturing equipment to halt, or cause damage to equipment. Normal manufacturing data includes data equivalent to operation result parameters. Normal manufacturing data may be stored in advance in storage 24. Storage 24 is implemented as, for example, semiconductor memory.

Communication unit 25 is a communication interface capable of communicating with virtual manufacturing apparatus 30 and physical manufacturing apparatus 40. In this embodiment, for example, communication unit 25 is capable of receiving, for example, operation result parameters from, for example, virtual manufacturing apparatus 30.

Input/output unit 26 is a device capable of inputting/outputting manufacturing data. Input/output unit 26 may input/output data from, for example, a computer-readable recording medium. Examples of recording mediums include flexible disks, hard disks, CD-ROMs, MOs, DVDs, DVD-ROMs, DVD-RAMs, BDs (Blu-ray™ Discs), and semiconductor memory. Moreover, input/output unit 26 may be connected to another interface over a network.

VIRTUAL MANUFACTURING APPARATUS

Virtual manufacturing apparatus 30 virtually manufactures a product by simulation, based on manufacturing data received from manufacture control apparatus 20. Here, virtual manufacturing apparatus 30 receives control information for the starting and stopping of manufacturing from manufacture control apparatus 20, and transmits, for example, operation result parameters for virtual manufacturing apparatus 30 to manufacture control apparatus 20. For example, virtual manufacturing apparatus 30 operates on a personal computer, and is implemented as a simulator that simulates, for example, a component mounting apparatus, reflow apparatus, inspector, printer, or any combination thereof. Note that since manufacturing is only performed virtually in virtual manufacturing apparatus 30, even if an abnormal operation is performed during the virtual manufacture, this does not halt manufacturing equipment, manufacture defective goods, or damage equipment.

The simulator implemented as virtual manufacturing apparatus 30 may operate on virtual software (VMWare™, VirtualBox™). By implementing virtual manufacturing apparatus 30 as a simulator on virtual software, even if a simulator were to operate abnormally, virtual manufacturing apparatus 30 would not harm the personal computer running the virtual software.

Virtual manufacturing apparatus 30 includes virtual-side control unit 31, virtual manufacturing unit 32, abnormality determination unit 33, storage 34, and communication unit 35.

Virtual-side control unit 31 manages, for example, virtual manufacturing unit 32, abnormality determination unit 33, storage 34, and communication unit 35. Virtual-side control unit 31 causes virtual manufacturing unit 32 to manufacture a product based on manufacturing data. Virtual-side control unit 31 transmits, to manufacture control apparatus 20 via communication unit 35, for example, operation result parameters generated by virtual manufacturing unit 32, and information related to the determination result of abnormality determination unit 33. Virtual-side control unit 31 stores, for example, manufacturing data received from manufacture control apparatus 20 and operation result parameters generated by virtual manufacturing unit 32 in storage 34.

Virtual manufacturing unit 32 is a simulator that virtually manufactures a product based on manufacturing data, and is, for example, a virtual component mounting apparatus that manufactures a product. Virtual manufacturing unit 32 generates operation result parameters related to the virtual manufacture of a product based on manufacturing data. More specifically, for example, when physical manufacturing apparatus 40 is configured as a component mounting line, virtual manufacturing unit 32 generates operation result parameters for the simulated component mounting apparatus. Even more specifically, based on manufacturing data, virtual manufacturing unit 32 simulates a sequence of operations, namely, the obtaining of a specific component from a specific location by the component mounting apparatus and the arranging or inserting of specific components in a specific location and a specific orientation on a substrate.

Here, manufacturing data includes data related to component arrangement, data related to substrate component positions, and data related to image recognition.

Data related to component arrangement includes information on where to arrange what components on the component mounting apparatus. Data related to substrate component positions includes information on where to mount what components on the substrate. Data related to image recognition includes information on, for example, component dimensions and the number of or pitch between leads.

Here, for example, if there is an abnormality in the data related to component arrangement in the manufacturing data, a problem occurs in which a specific component cannot be obtained from a specific place on the component mounting apparatus. Moreover, for example, if there is an abnormality in the data related to substrate component positions in the manufacturing data, a problem occurs in which a specific component cannot be arranged or inserted in a specific position and specific orientation on the substrate. In this way, when there is an abnormality in the manufacturing data, the operation result parameters of the simulated component mounting apparatus indicate abnormal values. Stated differently, an abnormality in the manufacturing data manifests as one or more abnormal parameter values different from what is output by virtual-side control unit 31. Examples of the parameters include, in the component mounting apparatus, coordinates at which components are to be mounted on the substrate, orientation of components to be mounted on the substrate by the component mounting apparatus, the type of the component to be mounted by the component mounting apparatus and the type of the substrate, the rotational speed of, for example, a driving unit that drives a head that mounts the components to the substrate, head velocity, component mounting apparatus voltage, component mounting apparatus current, and temperature during reflow. In one example, when the range of movement of an arm including a head greatly exceeds the limit allowed by the component mounting apparatus, or exceeds configuration information defining the capacity of the component mounting apparatus, the parameters of the component mounting apparatus can be said to be abnormal.

Moreover, in virtually manufactured products, there are abnormalities where, for example, components are arranged, inserted, or placed in orientations different from that of a normally produced product.

If, in the manufacturing data, for example, data related to the arrangement of components, data related to substrate component location, and data related to image recognition is normal data, the product virtually manufactured by virtual manufacturing unit 32 (the operation result parameter generated by virtual manufacturing unit 32) is approximately the same result as a product manufactured by physical manufacturing apparatus 40.

Virtual manufacturing unit 32 generates, for example, operation result parameters, and transmits, for example, operation result parameters to abnormality determination unit 33.

Moreover, when virtually manufacturing a product based on manufacturing data, virtual manufacturing unit 32 may successively transmit, to manufacture control apparatus 20, information related to manufacturing processes, which forms part of the operation result parameters.

Abnormality determination unit 33 is a device that determines whether the operation result parameters received from virtual manufacturing unit 32 are abnormal or normal. Stated differently, abnormality determination unit 33 is a device that determines whether or not there is an abnormality in the virtual manufacture of a product from operation result parameters, based on communication information between virtual-side control unit 31 and virtual manufacturing unit 32. Specifically, abnormality determination unit 33 compares operation result parameters and normal manufacturing data stored in storage 34, and determines whether there is an abnormality or not. In one example, abnormality determination unit 33 determines that there is an abnormality in the manufacturing when there is an abnormal parameter value among one of parameters pertaining to, in the component mounting apparatus, coordinates at which components are to be mounted on the substrate, component material, orientation of components to be mounted on the substrate by the component mounting apparatus, the type of the component to be mounted by the component mounting apparatus and the type of the substrate, the rotational speed of, for example, a driving unit that drives a head that mounts the components to the substrate, head velocity, component mounting apparatus voltage, component mounting apparatus current, and temperature during reflow. Abnormality determination unit 33 then generates abnormality information (information related to the determination result) indicating a determination result of "abnormal". In other words, abnormality determination unit 33 associates abnormality information with an operation result parameter generated based on manufacturing data.

On the other hand, when the operation result parameters and the normal manufacturing data stored in storage 34 are approximately the same, abnormality determination unit 33 generates normality information (information related to the determination result) indicating a determination result of "normal". Abnormality determination unit 33 associates normality information with an operation result parameter generated based on manufacturing data.

Abnormality determination unit 33 transmits such information related to the determination results to virtual-side control unit 31. Note that normal manufacturing data is data including parameters that fall within a margin of error with respect to the component mounting apparatus described above. If the parameters are within this margin of error, abnormality determination unit 33 determines that the operation result parameters are approximately the same as normal manufacturing data. Abnormality determination unit 33 associates the generated abnormality information and normality information with the corresponding operation result parameters and stores the resulting information in storage 34. Note that abnormality determination unit 33 may be provided in manufacture control apparatus 20.

Storage 34 is a storage device that stores, for example, normal manufacturing data, operation result parameters, and information related to the determination results. Storage 34 is implemented as, for example, semiconductor memory.

Communication unit 35 is a communication interface capable of communicating with manufacture control apparatus 20 and physical manufacturing apparatus 40. In this embodiment, for example, communication unit 35 is capable of transmitting information related to the determination results determined by abnormality determination unit 33, and is capable of receiving data such as manufacturing data.

Physical Manufacturing Apparatus

Physical manufacturing apparatus 40 is an apparatus that physically manufactures a product based on manufacturing data received from manufacture control apparatus 20, and is, for example, manufacturing line equipment used in a factory. Here, physical manufacturing apparatus 40 receives control information for the starting and stopping of manufacturing from manufacture control apparatus 20, and transmits, for example, operation result parameters to manufacture control apparatus 20.

Physical manufacturing apparatus 40 includes manufacture control unit 41, manufacturing unit 42, storage 44, and communication unit 45.

Manufacture control unit 41 manages manufacturing unit 42, storage 44, and communication unit 45. Manufacture control unit 41 receives manufacturing data from manufacture control apparatus 20 and stores the received manufacturing data in storage 44. Manufacture control unit 41 receives control information for the starting and stopping of manufacturing from manufacture control apparatus 20, and is configured to cause manufacturing unit 42 to manufacture a product and stop manufacture of a product based on the manufacturing data. Manufacture control unit 41 transmits actual operation result parameters to manufacture control apparatus 20 via communication unit 45.

Manufacturing unit 42 is industrial equipment that physically manufactures a product based on manufacturing data. More specifically, for example, when manufacturing unit 42 is configured as a component mounting line, manufacturing unit 42 implements the operations of a component mounting apparatus. In the case of component mounting, based on manufacturing data, manufacturing unit 42 performs operations of obtaining a specific component from a specific location on the component mounting apparatus and arranging or inserting specific components in a specific location and a specific orientation on a substrate.

Moreover, when physically manufacturing a product based on manufacturing data, manufacturing unit 42 may successively transmit, to manufacture control apparatus 20, information related to manufacturing processes, which forms part of the operation result parameters. In such cases, control unit 21 in manufacture control apparatus 20 may determine whether the information related to manufacturing processes is normal manufacturing data or not. If the information related to manufacturing processes includes an abnormality, manufacture control apparatus 20 may give notice of the abnormality in the manufacturing data. Accordingly, abnormality determination unit 33 that determines the information related to the manufacturing processes may be provided in manufacture control apparatus 20. Note that if there is an abnormality in the manufacturing data, manufacturing data may be newly generated.

Storage 44 is a storage device that stores, for example, manufacturing data and operation result parameters. Storage 44 is implemented as, for example, semiconductor memory.

Communication unit 45 is a communication interface capable of communicating with manufacture control apparatus 20 and virtual manufacturing apparatus 30. In this embodiment, for example, communication unit 45 is capable of transmitting operation result parameters, and is capable of receiving data such as manufacturing data.

Manufacturing System Operations

Next, operations performed by product manufacturing system 10 will be described with reference to FIG. 3 through FIG. 5.

Figure 3:
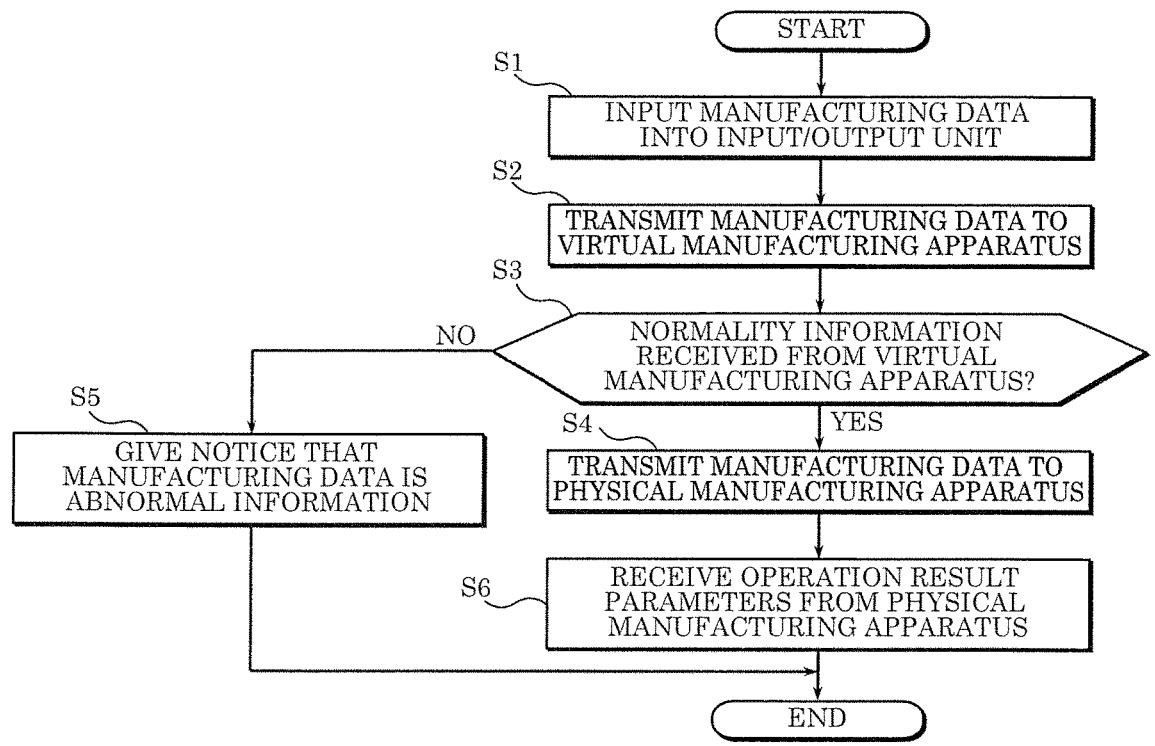
FIG. 3 is a flow chart for a manufacture control apparatus in the product manufacturing system according to Embodiment 1.

FIG. 3 is a flow chart for manufacture control apparatus 20 in the product manufacturing system according to Embodiment 1. FIG. 4 is a flow chart for virtual manufacturing apparatus 30 in the product manufacturing system according to Embodiment 1. FIG. 5 is a flow chart for physical manufacturing apparatus 40 in the product manufacturing system according to Embodiment 1.

As illustrated in FIG. 3, first, in manufacturing system 10, manufacturing data is input into input/output unit 26 in manufacture control apparatus 20 (step S1). The manufacturing data input into manufacture control apparatus 20 is stored in storage 24 in manufacture control apparatus 20.

Next, control unit 21 in manufacture control apparatus 20 transmits the manufacturing data to virtual manufacturing apparatus 30 via communication unit 25 in manufacture control apparatus 20 (step S2).

Figure 4:
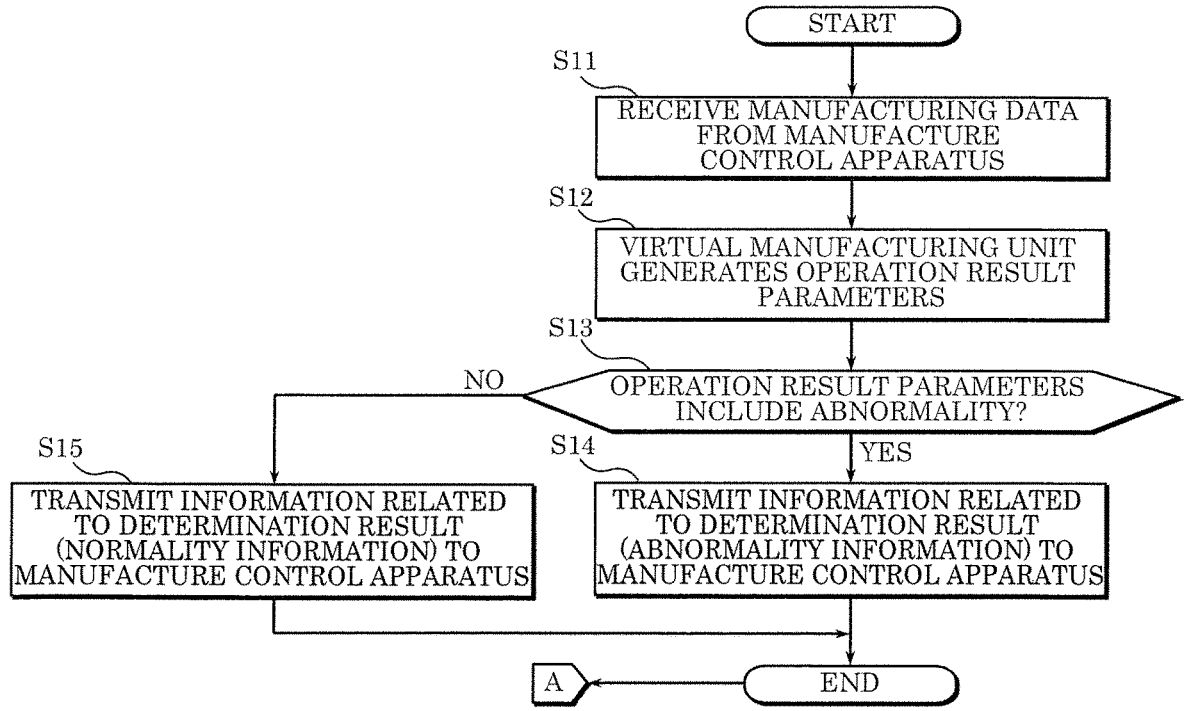
FIG. 4 is a flow chart for a virtual manufacturing apparatus in the product manufacturing system according to Embodiment 1.

Next, as illustrated in FIG. 4, virtual manufacturing apparatus 30 receives the manufacturing data from manufacture control apparatus 20 via communication unit 35 in virtual manufacturing apparatus 30 (step S11). Virtual-side control unit 31 stores the received manufacturing data in storage 34.

Next, virtual-side control unit 31 causes virtual manufacturing unit 32 to virtually manufacture a product by simulation based on the manufacturing data. In other words, virtual-side control unit 31 causes virtual manufacturing unit 32 to generate operation result parameters (one example of the virtual manufacture step (step S12)). In other words, in the virtual manufacture step, virtual manufacture of a product is performed via simulation based on product manufacturing data. Virtual-side control unit 31 stores the generated operation result parameters in storage 34.

Next, virtual manufacturing unit 32 transmits the operation result parameters to abnormality determination unit 33 in virtual manufacturing apparatus 30. Then, abnormality determination unit 33 determines whether the operation result parameters include an abnormality or not (one example of the abnormality determination step (step S13)). In other words, in the abnormality determination step, it is determined whether there is an abnormality in the virtual manufacture of the product performed in the virtual manufacture step. When the operation result parameters are determined to include an abnormality (yes in step S13), abnormality determination unit 33 generates information (i.e., abnormality information) related to the determination result associated with the operation result parameters. Virtual manufacturing unit 32 transmits the abnormality information indicating that the operation result parameters include an abnormality to manufacture control apparatus 20 via communication unit 35 (step S14). The flow of these processes in virtual manufacturing apparatus 30 ends, and processing proceeds to step S3 in FIG. 3.

On the other hand, when abnormality determination unit 33 determines the operation result parameters to be normal (no in step S13), information (i.e., normality information) related to the determination result associated with the operation result parameters is generated. Virtual manufacturing unit 32 transmits the normality information indicating that the operation result parameters are normal to manufacture control apparatus 20 via communication unit 35 (step S15). The flow of these processes in virtual manufacturing apparatus 30 ends, and processing proceeds to step S3 in FIG. 3. Note that in steps S14 and S15, the operation result parameters generated by virtual manufacturing unit 32 may be transmitted to manufacture control apparatus 20. Moreover, manufacture control apparatus 20 may store the received operation result parameters in storage 24.

Next, as illustrated in FIG. 3, control unit 21 in manufacture control apparatus 20 determines whether the information received from virtual manufacturing apparatus 30 is abnormality information or normality information (step S3). If the information received from virtual manufacturing apparatus 30 is the normality information (yes in step S3), control unit 21 in manufacture control apparatus 20 transmits the manufacturing data to physical manufacturing apparatus 40 via communication unit 25 in manufacture control apparatus 20 (step S4).

On the other hand, if the information received from virtual manufacturing apparatus 30 is the abnormality information (no in step S3), control unit 21 in manufacture control apparatus 20 gives notice that the manufacturing data is abnormal information (step S5). The flow of these processes in manufacture control apparatus 20 ends, and processing proceeds to the flow of processes for physical manufacturing apparatus 40 in FIG. 5.

Figure 5:
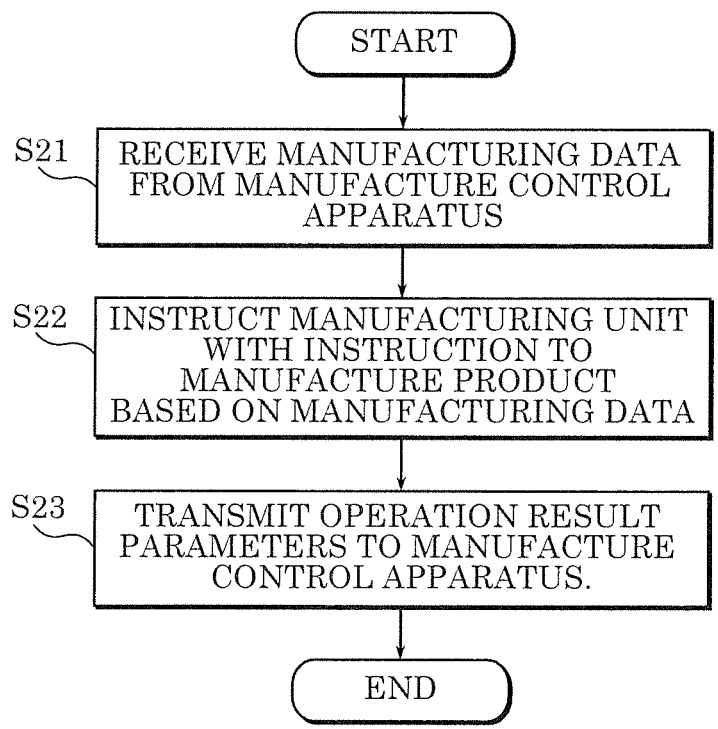
FIG. 5 is a flow chart for a physical manufacturing apparatus in the product manufacturing system according to Embodiment 1.

Next, as illustrated in FIG. 5, physical manufacturing apparatus 40 receives the manufacturing data from manufacture control apparatus 20 transmitted in step S4 in FIG. 3 (step S21). Then, manufacture control unit 41 in physical manufacturing apparatus 40 stores the manufacturing data in storage 44.

Next, manufacture control unit 41 instructs manufacturing unit 42 with an instruction to manufacture a physical product based on the manufacturing data (one example of the physical manufacture step (step S22)). In other words, when no abnormality is determined from the virtual manufacture of the product in the abnormality determination step, the physical manufacture step physically manufactures a product based on the manufacturing data.

Next, manufacturing unit 42 manufactures the product based on the manufacturing data and generates operation result parameters based on the manufacturing data. Manufacture control unit 41 stores the operation result parameters generated by manufacturing unit 42 in storage 44. Manufacture control unit 41 transmits the operation result parameters to manufacture control apparatus 20 via communication unit 45 (step S23). The flow of these processes in physical manufacturing apparatus 40 ends, and processing proceeds to step S3 in FIG. 3.

Next, manufacture control apparatus 20 receives the operation result parameters from physical manufacturing apparatus 40 (step S6), and stores the operation result parameters in storage 24 in manufacture control apparatus 20. Then, the sequence of processes in manufacturing system 10 ends. Note that the flow charts illustrated in FIG. 3 through FIG. 5 are not implemented only once; after the first flow of processes is implemented, a new flow of processes can be performed.

In this way, before physically manufacturing a product, virtual manufacturing apparatus 30 virtually manufactures the product via simulation. If there is an abnormality in the operation result parameters in virtual manufacturing apparatus 30, manufacturing by physical manufacturing apparatus 40 is not performed, and if the operation result parameters in virtual manufacturing apparatus 30 are normal, manufacturing by physical manufacturing apparatus 40 is performed. Note that if the operation result parameters in virtual manufacturing apparatus 30 include an abnormality, abnormality information is notified externally. For example, an alarm may be ringed, and the location of the problem based on the manufacturing processes and manufacturing result may be displayed on a display screen. If the operation result parameters in virtual manufacturing apparatus 30 are normal, a desired product can be produced since physical manufacturing apparatus 40 manufactures the product based on the manufacturing data.

Next, an example of operations performed by manufacturing system 10 when the manufacturing data is normal will be described with reference to FIG. 6.

Figure 6:
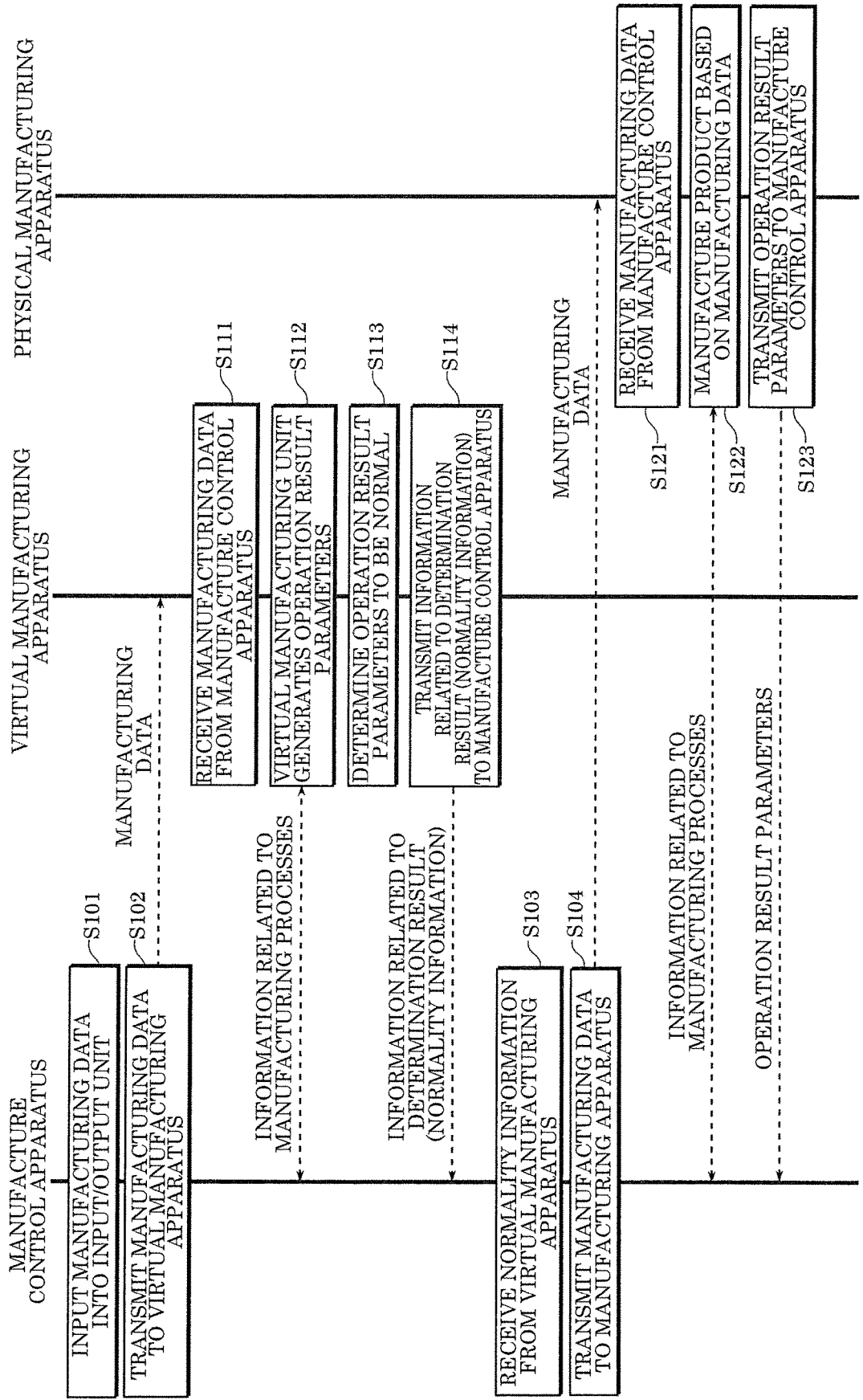
FIG. 6 is a sequence diagram of processes performed in the product manufacturing system according to Embodiment 1 when the manufacturing data is normal.

FIG. 6 is a sequence diagram of processes performed in product manufacturing system 10 according to Embodiment 1 when the manufacturing data is normal.

First, as illustrated in FIG. 6, manufacturing data is input into manufacture control apparatus 20 from input/output unit 26 (step S101). The manufacturing data input into manufacture control apparatus 20 is stored in storage 24 in manufacture control apparatus 20.

Next, control unit 21 in manufacture control apparatus 20 transmits the manufacturing data to virtual manufacturing apparatus 30 via communication unit 25 in manufacture control apparatus 20 (step S102).

Next, virtual manufacturing apparatus 30 receives the manufacturing data from manufacture control apparatus 20 (step S111). Virtual-side control unit 31 in manufacture control apparatus 20 stores the received manufacturing data in storage 34.

Next, virtual-side control unit 31 causes virtual manufacturing unit 32 to virtually manufacture a product based on the manufacturing data. In other words, virtual-side control unit 31 causes virtual manufacturing unit 32 to generate operation result parameters (step S112).

Next, virtual manufacturing unit 32 transmits the operation result parameters to abnormality determination unit 33 in virtual manufacturing apparatus 30. Abnormality determination unit 33 determines whether the operation result parameters include an abnormality or not. Since FIG. 6 illustrates an example in which the manufacturing data is normal, abnormality determination unit 33 determines the operation result parameters to be normal (step S113), and generates information (i.e., normality information) related to the determination result corresponding to the operation result parameters generated based on the manufacturing data. Virtual-side control unit 31 transmits the normality information to manufacture control apparatus 20 via communication unit 35 (step S114). Note that in steps S14 and S22, the operation result parameters generated by virtual manufacturing unit 32 may be transmitted to manufacture control apparatus 20. Moreover, manufacture control apparatus 20 may store the received operation result parameters in storage 24.

Next, control unit 21 in manufacture control apparatus 20 receives the normality information from virtual manufacturing apparatus 30 via communication unit 25 (step S103). Control unit 21 associates the manufacturing data simulated by virtual manufacturing apparatus 30 with the normality information and stores the information in storage 24.

Next, control unit 21 in manufacture control apparatus 20 transmits the manufacturing data determined to be normal information to physical manufacturing apparatus 40 via communication unit 25 in manufacture control apparatus 20 (step S104).

Next, physical manufacturing apparatus 40 receives the manufacturing data from manufacture control apparatus 20 (step S121). Then, manufacture control unit 41 in physical manufacturing apparatus 40 stores the manufacturing data in storage 44.

Next, manufacture control unit 41 causes manufacturing unit 42 to physically manufacture the product based on the manufacturing data (step S122). Note that virtual manufacturing apparatus 30 transmits information related to manufacturing processes to manufacture control apparatus 20, and receives control information from manufacture control apparatus 20.

Next, manufacturing unit 42 generates operation result parameters for a product physically manufactured, and transmits the operation result parameters to manufacture control apparatus 20 (step S123). Control unit 21 in manufacture control apparatus 20 receives the operation result parameters via communication unit 25, and stores the operation result parameters in storage 24 in manufacture control apparatus 20. In this way, in manufacturing system 10, it is possible to manufacture a desired product since the product can be manufactured based on normal manufacturing data.

Next, an example of operations performed by manufacturing system 10 when the manufacturing data includes an abnormality will be described with reference to FIG. 7.

Figure 7:
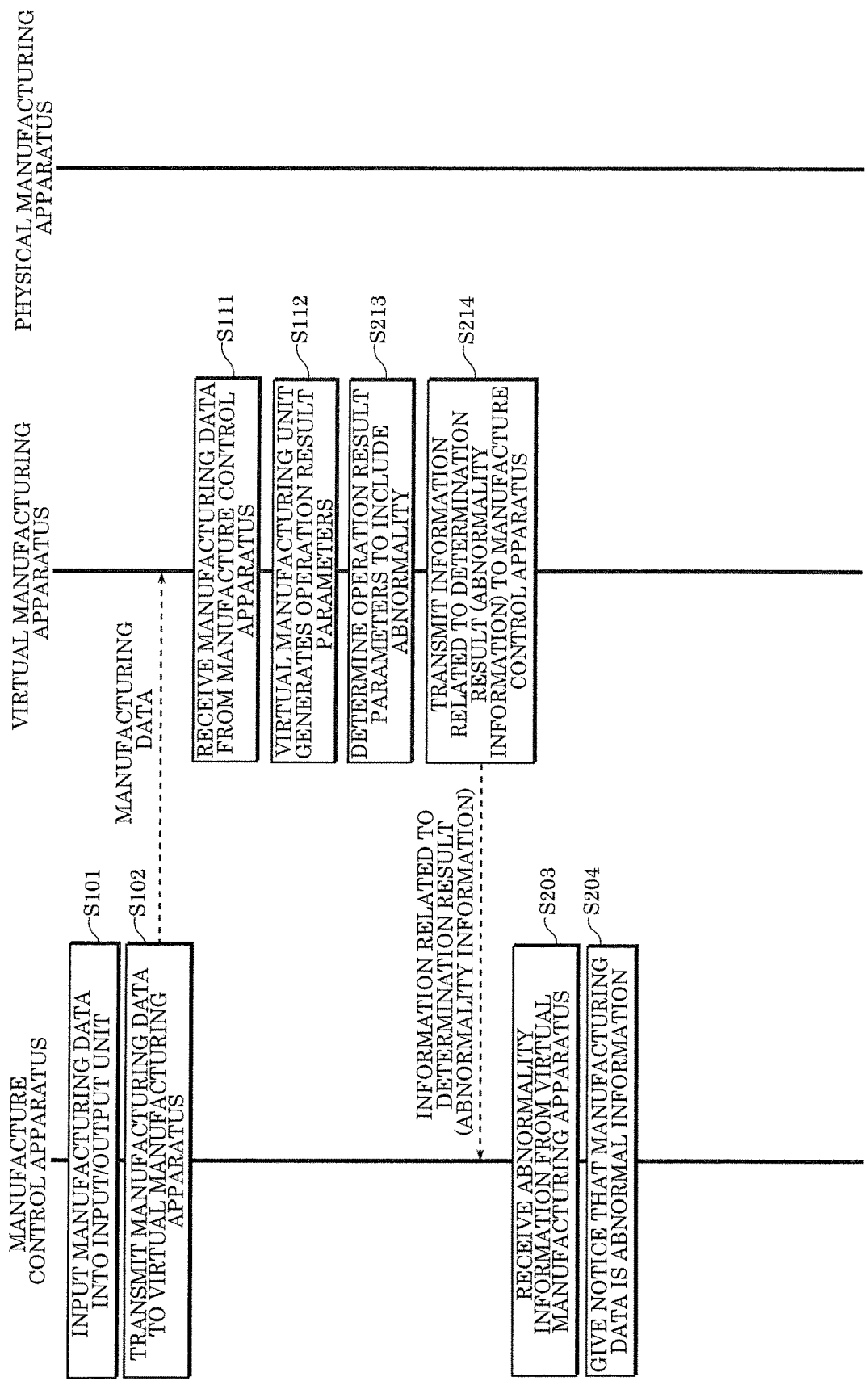
FIG. 7 is a sequence diagram of processes performed in the product manufacturing system according to Embodiment 1 when the manufacturing data includes an abnormality.

FIG. 7 is a sequence diagram of processes performed in product manufacturing system 10 according to Embodiment 1 when the manufacturing data includes an abnormality.

As illustrated in FIG. 7, in manufacturing system 10, the same processes as in steps S101, S102, S111, and S112 in FIG. 6 are performed. Since FIG. 7 illustrates an example in which the manufacturing data includes an abnormality, abnormality determination unit 33 determines the operation result parameters to include an abnormality (step S213), and generates information (i.e., abnormality information) related to the determination result corresponding to the operation result parameters generated based on the manufacturing data. Virtual-side control unit 31 transmits the abnormality information to manufacture control apparatus 20 via communication unit 35 (step S214). Note that in step S214, the operation result parameters generated by virtual manufacturing unit 32 may be transmitted to manufacture control apparatus 20. Moreover, manufacture control apparatus 20 may store the received operation result parameters in storage 24.

Next, control unit 21 in manufacture control apparatus 20 receives the abnormality information from virtual manufacturing apparatus 30 via communication unit 25 in manufacture control apparatus 20 (step S203). Control unit 21 in manufacture control apparatus 20 associates the manufacturing data simulated by virtual manufacturing apparatus 30 with the abnormality information and stores the information in storage 24.

Next, control unit 21 in manufacture control apparatus 20 gives notice that the manufacturing data is abnormal information. In such cases, manufacture control apparatus 20 does not transmit the abnormal manufacturing data to physical manufacturing apparatus 40.

Operational Advantages

Next, operational advantages of product manufacturing system 10 according to the present embodiment will be described.

As described above, in product manufacturing system 10 according to this embodiment, a product is manufactured. Product manufacturing system 10 includes: manufacture control apparatus 20 that holds manufacturing data on the product; virtual manufacturing apparatus 30 that virtually manufactures the product by simulation, based on the manufacturing data on the product held in manufacture control apparatus 20; physical manufacturing apparatus 40 that physically manufactures the product based on the manufacturing data held in manufacture control apparatus 20; and abnormality determination unit 33 that determines whether there is an abnormality in the virtual manufacture of the product by virtual manufacturing apparatus 30. When abnormality determination unit 33 determines there to be no abnormality from the virtual manufacture of the product, physical manufacturing apparatus 40 physically manufactures the product.

With manufacturing system 10 configured in such a manner, there are cases in which manufacturing data is altered and includes an abnormality when already in manufacture control apparatus 20, and cases in which manufacturing data is altered over a network so as to include an abnormality. With the above-described configuration, since virtual manufacturing apparatus 30 virtually manufactures a product via simulation based on manufacturing data for the product, even if there is an abnormality in the manufacturing data, it is possible to determine whether there is an abnormality in the virtual manufacture of the product performed by virtual manufacturing apparatus.

Accordingly, in such a manufacturing system 10, it is possible to detect an abnormality in manufacturing data without having to significantly modify an existing manufacturing system. In this way, with manufacturing system 10, it is possible to detect an abnormality in manufacturing data before the product is physically manufactured, making it possible to prevent malfunctions in physical manufacturing apparatus 40, such as the manufacture of defective goods, the halting of manufacturing equipment, and damage of equipment based on abnormal manufacturing data.

A product manufacturing method according to this embodiment manufactures a product. The method includes: virtually manufacturing the product by simulation, based on manufacturing data on the product; determining whether there is an abnormality in the virtual manufacturing of the product; and physically manufacturing the product based on the manufacturing data when the determining determines there to be no abnormality from the virtual manufacturing of the product.

This manufacturing method achieves the same operational advantages as product manufacturing system 10.

Moreover, in product manufacturing system 10 according to this embodiment, virtual manufacturing apparatus 30 includes: virtual manufacturing unit 32 that virtually manufactures the product based on the manufacturing data; and virtual-side control unit 31 that controls operation of virtual manufacturing unit 32 based on the manufacturing data. Abnormality determination unit 33 is provided in virtual manufacturing apparatus 30.

With this, after virtual manufacturing unit 32 virtually manufactures the product, abnormality determination unit 33 determines whether there is an abnormality in the virtual manufacture of the product by virtual manufacturing unit 32. Accordingly, just like with manufacturing system 10, it is possible to prevent malfunctions in physical manufacturing apparatus 40, such as the manufacture of defective goods, the halting of manufacturing equipment, and damage of equipment based on abnormal manufacturing data.

Moreover, in product manufacturing system 10 according to this embodiment, virtual manufacturing unit 32 generates an operation result parameter related to the virtual manufacture of the product, and abnormality determination unit 33 determines whether there is an abnormality in the virtual manufacture of the product based on the operation result parameter.

With this, since abnormality determination unit 33 determines whether there is an abnormality or not based on operation result parameters received from virtual manufacturing unit 32, it is easy to identify the part of the manufacturing data, based on which virtual manufacturing unit 32 virtually manufactured the product, that is abnormal, by analyzing the operation result parameters.

Moreover, in product manufacturing system 10 according to this embodiment, virtual manufacturing unit 32 is a virtual component mounting apparatus that manufactures the product, and the operation result parameter includes at least one of: coordinates at which the component mounting apparatus is to mount a component on a substrate; an orientation in which the component mounting apparatus is to mount the component on the substrate; a type of the component to be mounted by the component mounting apparatus and a type of the substrate; a rotational speed of the component mounting apparatus; a velocity of the component mounting apparatus; a voltage of the component mounting apparatus; a current of the component mounting apparatus; and a temperature of the component mounting apparatus.

With this, since abnormality determination unit 33 determines whether there is an abnormality or not based on specific operation result parameters, it is easy to identify the part of the manufacturing data, based on which virtual manufacturing unit 32 virtually manufactured the product, that is abnormal, by analyzing the operation result parameters.

Moreover, in product manufacturing system 10 according to this embodiment, abnormality determination unit 33 determines whether there is an abnormality in the manufacture of the product based on communication information between virtual-side control unit 31 and virtual manufacturing unit 32.

With this, since abnormality determination unit 33 reads control of operations transmitted to virtual manufacturing unit 32 by virtual-side control unit 31 from communication information between virtual-side control unit 31 and virtual manufacturing unit 32 in virtual manufacturing apparatus 30, it is possible to determine whether there is an abnormality in the operation result parameters early on.

Variation of Embodiment 1

Next, manufacturing system 100 according to this variation will be described with reference to FIG. 8.

Figure 8:
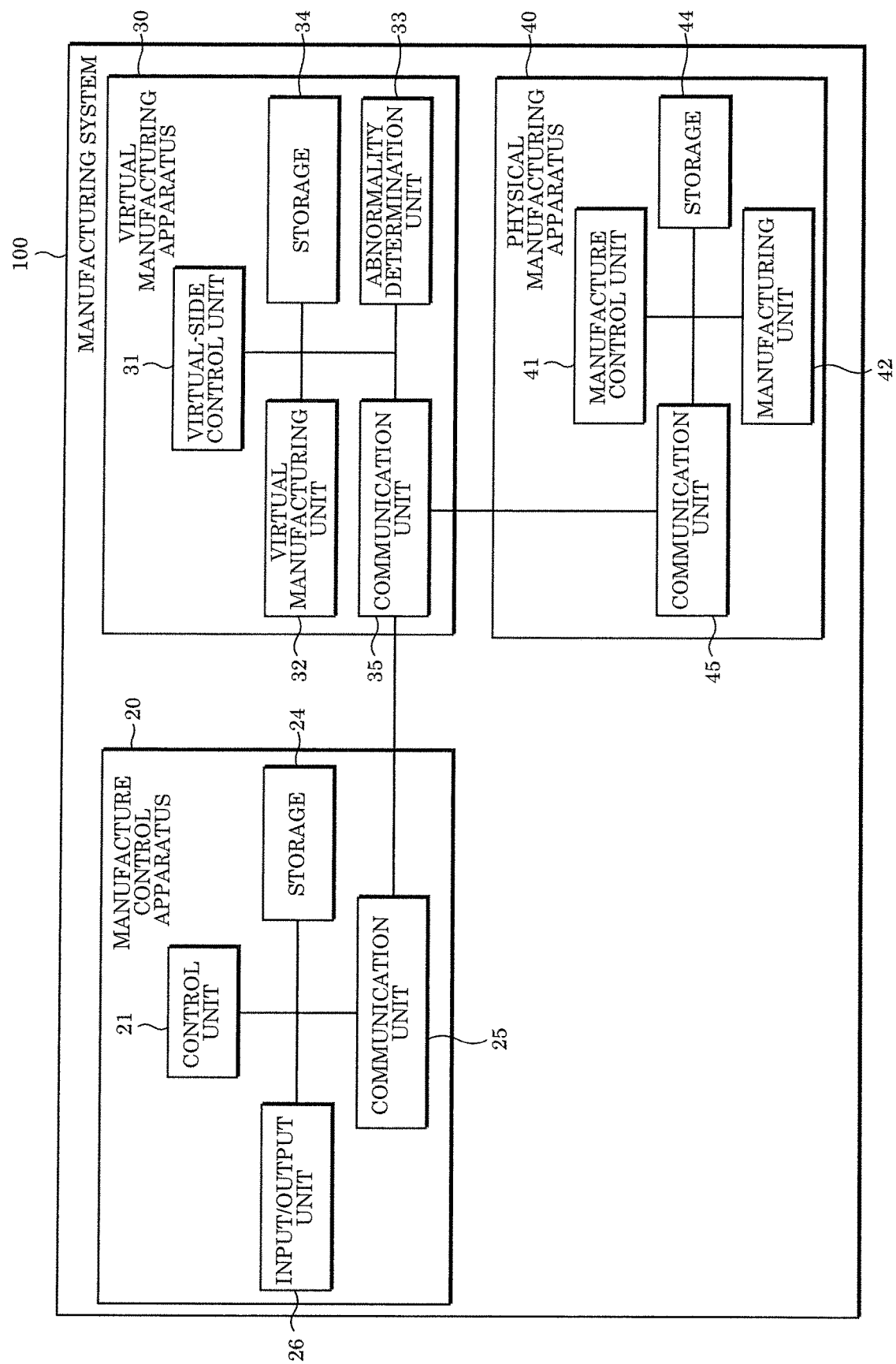
FIG. 8 is a block diagram of a product manufacturing system according to a variation of Embodiment 1.

FIG. 8 is a block diagram of product manufacturing system 100 according to a variation of Embodiment 1.

In Embodiment 1, manufacture control apparatus 20, virtual manufacturing apparatus 30, and physical manufacturing apparatus 40 are communicably connected to one another, but in this variation, manufacture control apparatus 20, virtual manufacturing apparatus 30, and physical manufacturing apparatus 40 are connected in series in this order.

When other configurations are not described in this variation, it is because they are the same as in Embodiment 1. Moreover, like elements share like reference signs. Detailed description of such elements will be omitted.

Manufacture control apparatus 20, virtual manufacturing apparatus 30, and physical manufacturing apparatus 40 are connected together in series in this order. Virtual manufacturing apparatus 30 is communicably connected to manufacture control apparatus 20, and physical manufacturing apparatus 40 is communicably connected to virtual manufacturing apparatus 30. In other words, manufacture control apparatus 20 and physical manufacturing apparatus 40 cannot directly communicate; manufacture control apparatus 20 and physical manufacturing apparatus 40 are communicably connected via virtual manufacturing apparatus 30.

Moreover, in product manufacturing system 100 according to this variation, manufacture control apparatus 20, virtual manufacturing apparatus 30, and physical manufacturing apparatus 40 are connected together in series in this order.

When manufacture control apparatus 20, virtual manufacturing apparatus 30, and physical manufacturing apparatus 40 are communicably connected to one another, for example, control unit 21 in manufacture control apparatus 20 is required to set a transmission destination. Accordingly, when control unit 21 transmits manufacturing data to virtual manufacturing apparatus 30, there is a concern that abnormal manufacturing data may be directly transmitted to physical manufacturing apparatus 40 as the result of some malfunction.

However, with the configuration according to this variation, manufacture control apparatus 20 transmits the manufacturing data to physical manufacturing apparatus 40 via virtual manufacturing apparatus 30. In other words, virtual manufacturing apparatus 30 physically segments communication between manufacture control apparatus 20 and physical manufacturing apparatus 40. Accordingly, it is unlikely that abnormal manufacturing data will be directly transmitted to physical manufacturing apparatus 40 as the result of a malfunction.

This variation also achieves the other operational advantages achieved by Embodiment 1 as well.

Embodiment 2

Configuration

First, the configuration of malware detection system 300 according to this embodiment will be described.

Figure 9:
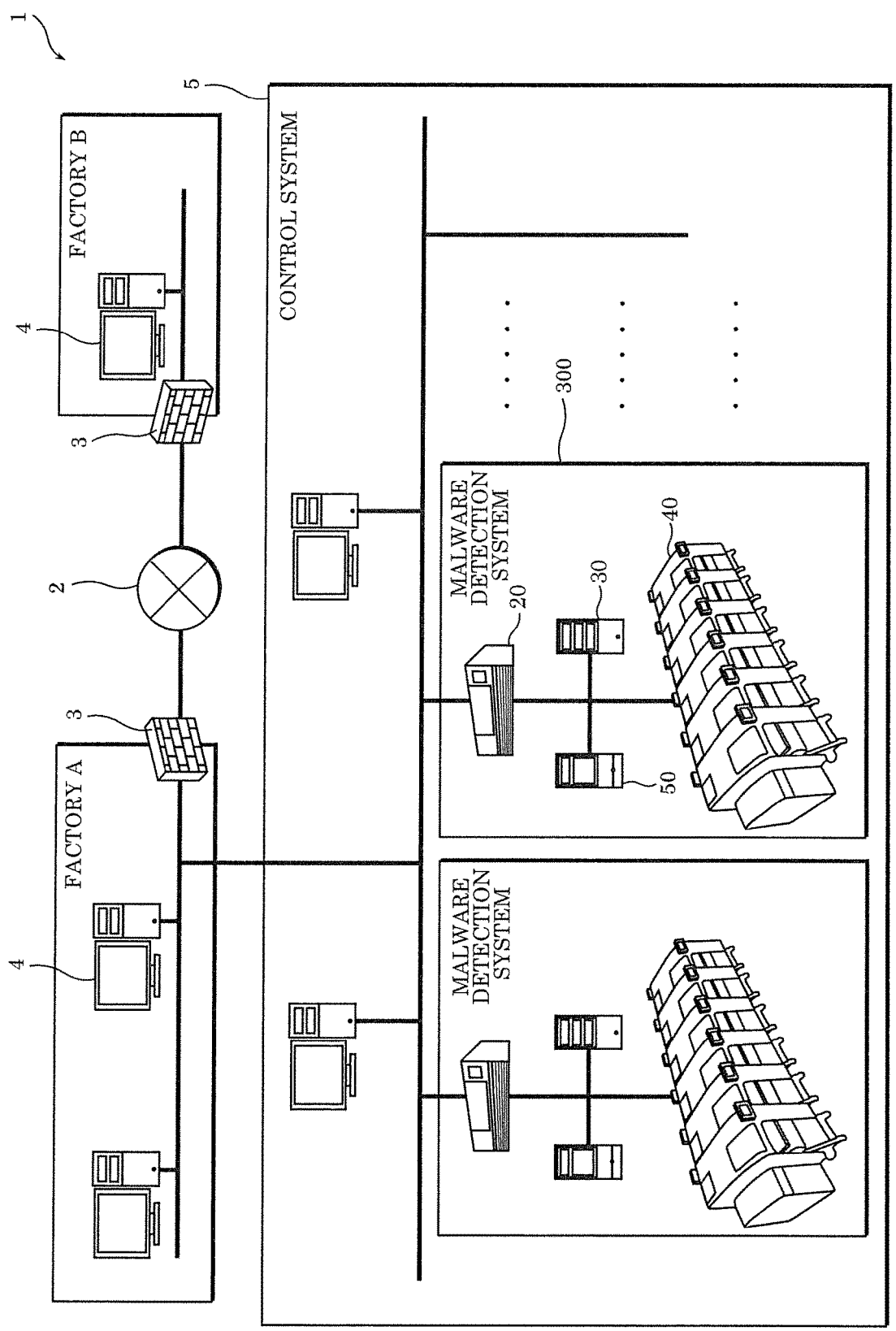
FIG. 9 schematically illustrates an industrial system including a malware detection system according to Embodiment 2.
Figure 10:
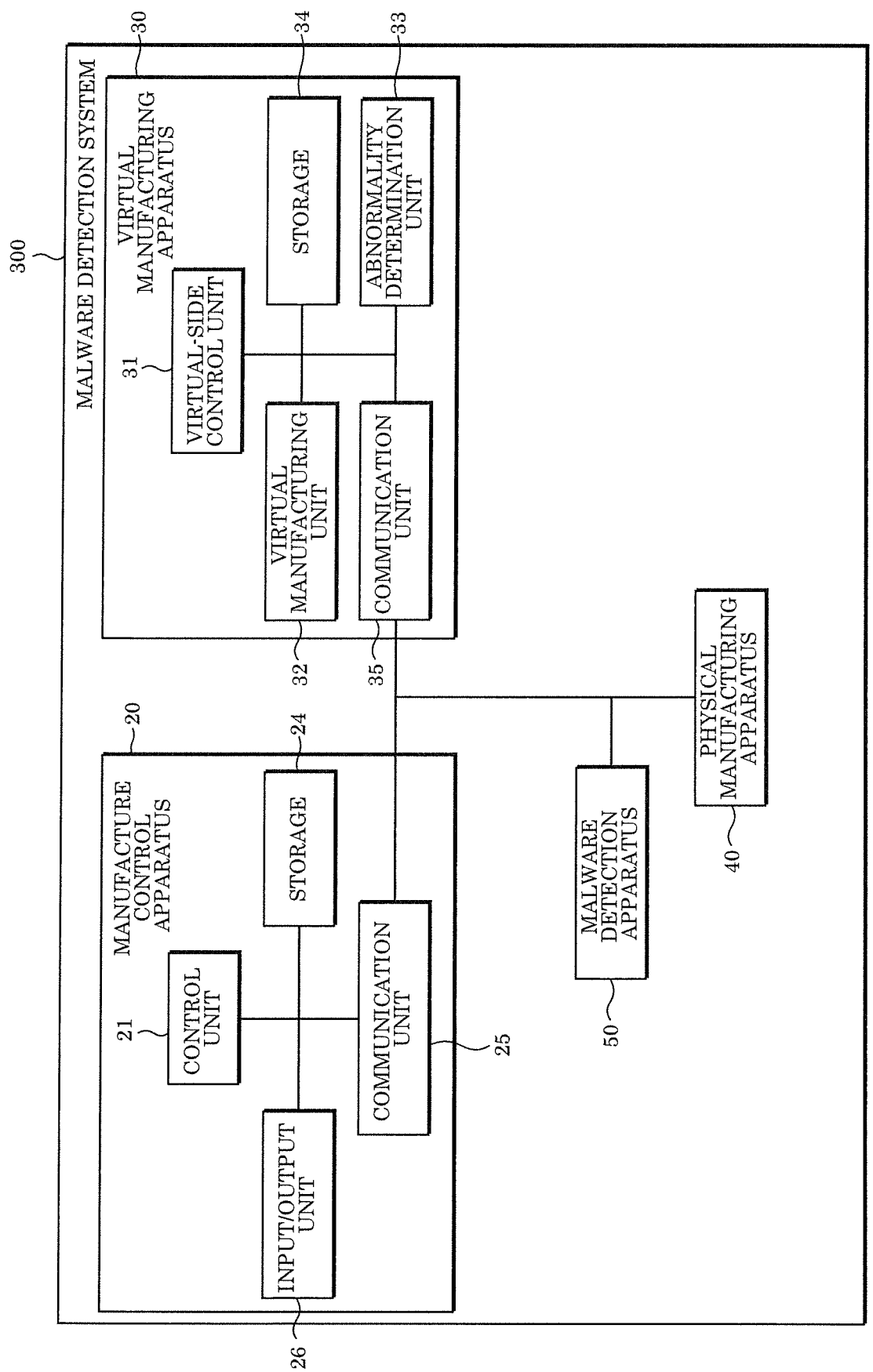
FIG. 10 is a block diagram of the malware detection system and a physical manufacturing apparatus according to Embodiment 2.

FIG. 9 schematically illustrates industrial system 1 including malware detection system 300 according to Embodiment 2. FIG. 10 is a block diagram of malware detection system 300 according to Embodiment 2.

Embodiment 2 differs from Embodiment 1 in that malware detection system 300 is equivalent to a configuration in which manufacturing system 100 according to Embodiment 1 further includes malware determination apparatus 50.

When other configurations are not described in this embodiment, it is because they are the same as in Embodiment 1. Moreover, like elements share like reference signs. Detailed description of such elements will be omitted.

As illustrated in FIG. 9 and FIG. 10, control system 5 includes functions appropriate for its application in industrial system 1, and, for example, monitors a production line, controls processes on a production line, and transmits information, such as manufacturing data, to terminal device 4. Control system 5 includes malware detection system 300 that manufactures a virtual product based on manufacturing data, and if there is no problem with the manufacturing data, manufactures a physical product based on the manufacturing data.

Malware detection system 300 detects malware that causes a malfunction in physical manufacturing apparatus 40 that physically manufactures a product. Malware detection system 300 includes manufacture control apparatus 20, virtual manufacturing apparatus 30, physical manufacturing apparatus 40, and malware determination apparatus 50. Manufacture control apparatus 20, virtual manufacturing apparatus 30, and malware determination apparatus 50 are communicably connected to one another over a network. Manufacture control apparatus 20, virtual manufacturing apparatus 30, and physical manufacturing apparatus 40 correspond to a manufacturing system.

Manufacture Control Apparatus

Manufacture control apparatus 20 can communicate with virtual manufacturing apparatus 30 and malware determination apparatus 50, and transmits newly input product manufacturing data to virtual manufacturing apparatus 30 and physical manufacturing apparatus 40.

Storage 24 is a storage device that stores, for example, normal manufacturing data, newly input product manufacturing data, operation result parameters, and information related to potential malware results.

Communication unit 25 is a communication interface capable of communicating with virtual manufacturing apparatus 30, physical manufacturing apparatus 40, and malware determination apparatus 50.

Virtual Manufacturing Apparatus

In one example, abnormality determination unit 33 determines that there is an abnormality in the manufacturing when there is an abnormal parameter value among one of parameters pertaining to, in the component mounting apparatus, coordinates at which components are to be mounted on the substrate, component material, orientation of components to be mounted on the substrate by the component mounting apparatus, the type of the component to be mounted by the component mounting apparatus and the type of the substrate, the rotational speed of, for example, a driving unit that drives a head that mounts the components to the substrate, head velocity, component mounting apparatus voltage, component mounting apparatus current, and temperature during reflow. Abnormality determination unit 33 then generates abnormality information (information related to the determination result) indicating a determination result of "abnormal".

Communication unit 35 is a communication interface capable of communicating with manufacture control apparatus 20, physical manufacturing apparatus 40, and malware determination apparatus 50.

Physical Manufacturing Apparatus

Physical manufacturing apparatus 40 is industrial equipment that physically manufactures a product based on manufacturing data received from manufacture control apparatus 20, and is, for example, manufacturing line equipment used in a factory. More specifically, for example, when the physical manufacturing apparatus is configured as a component mounting line, the physical manufacturing apparatus implements operations of a component mounting apparatus. In the case of component mounting, based on manufacturing data, the physical manufacturing apparatus performs operations of obtaining a specific component from a specific location on the component mounting apparatus and arranging or inserting specific components in a specific location and a specific orientation on a substrate. Physical manufacturing apparatus 40 receives control information for the starting and stopping of manufacturing from manufacture control apparatus 20, and transmits, for example, operation result parameters to manufacture control apparatus 20.

Physical manufacturing apparatus 40 receives manufacturing data from manufacture control apparatus 20 and stores the received manufacturing data in storage in physical manufacturing apparatus 40. Physical manufacturing apparatus 40 receives control information for the starting and stopping of manufacturing from manufacture control apparatus 20, and is configured to cause the manufacturing unit to manufacture a product and stop manufacture of a product based on the manufacturing data. Physical manufacturing apparatus 40 may transmit actual operation result parameters to manufacture control apparatus 20.

Malware Determination Apparatus

When, in a state in which at least one of manufacture control apparatus 20 and virtual manufacturing apparatus 30 is infected with potential malware, malware determination apparatus 50 detects an abnormality from the virtual manufacture of a product implemented by virtual manufacturing apparatus 30 based on manufacturing data, malware determination apparatus 50 determines that the potential malware is malware. Moreover, malware determination apparatus 50 may determine whether the potential malware is malware or not based on, for example, operation result parameters and/or operational status.

In malware detection system 300, regarding the determination of whether manufacturing data is malware or not, for example, before malware determination apparatus 50 infects manufacture control apparatus 20 and virtual manufacturing apparatus 30 with potential malware, virtual manufacturing apparatus 30 and physical manufacturing apparatus 40 manufacture the product based on normal manufacturing data. More specifically, malware determination apparatus 50 compares (i) operation result parameters generated by virtual manufacturing apparatus 30 based on normal manufacturing data and (ii) operation result parameters generated by virtual manufacturing apparatus 30 after virtual manufacturing apparatus 30 is infected with potential malware, and determines whether the manufacturing data is malware or not.

In manufacture control apparatus 20 as well, malware determination apparatus 50 determines whether an abnormality has been detected from operation information on control unit 21, storage 24, communication unit 25, and input/output unit 26 included in manufacture control apparatus 20. Moreover, malware determination apparatus 50, for example, determines whether manufacture control apparatus 20 can normally support virtual manufacturing apparatus 30 and physical manufacturing apparatus 40. When manufacture control apparatus 20 causes physical manufacturing apparatus 40 to manufacture the product, malware determination apparatus compares (i) operation result parameters generated by physical manufacturing apparatus 40 based on normal manufacturing data and (ii) operation result parameters generated by physical manufacturing apparatus 40 after manufacture control apparatus 20 is infected with potential malware, upon instruction from the infected manufacture control apparatus 20, and determines whether the manufacturing data is malware or not.

Malware Detection System Operations

Next, operations performed by malware detection system 300 (i.e., the malware detection method) will be described with reference to FIG. 11 through FIG. 13. The malware detection method detects malware that causes a malfunction in physical manufacturing apparatus 40 that physically manufactures the product.

Figure 11:
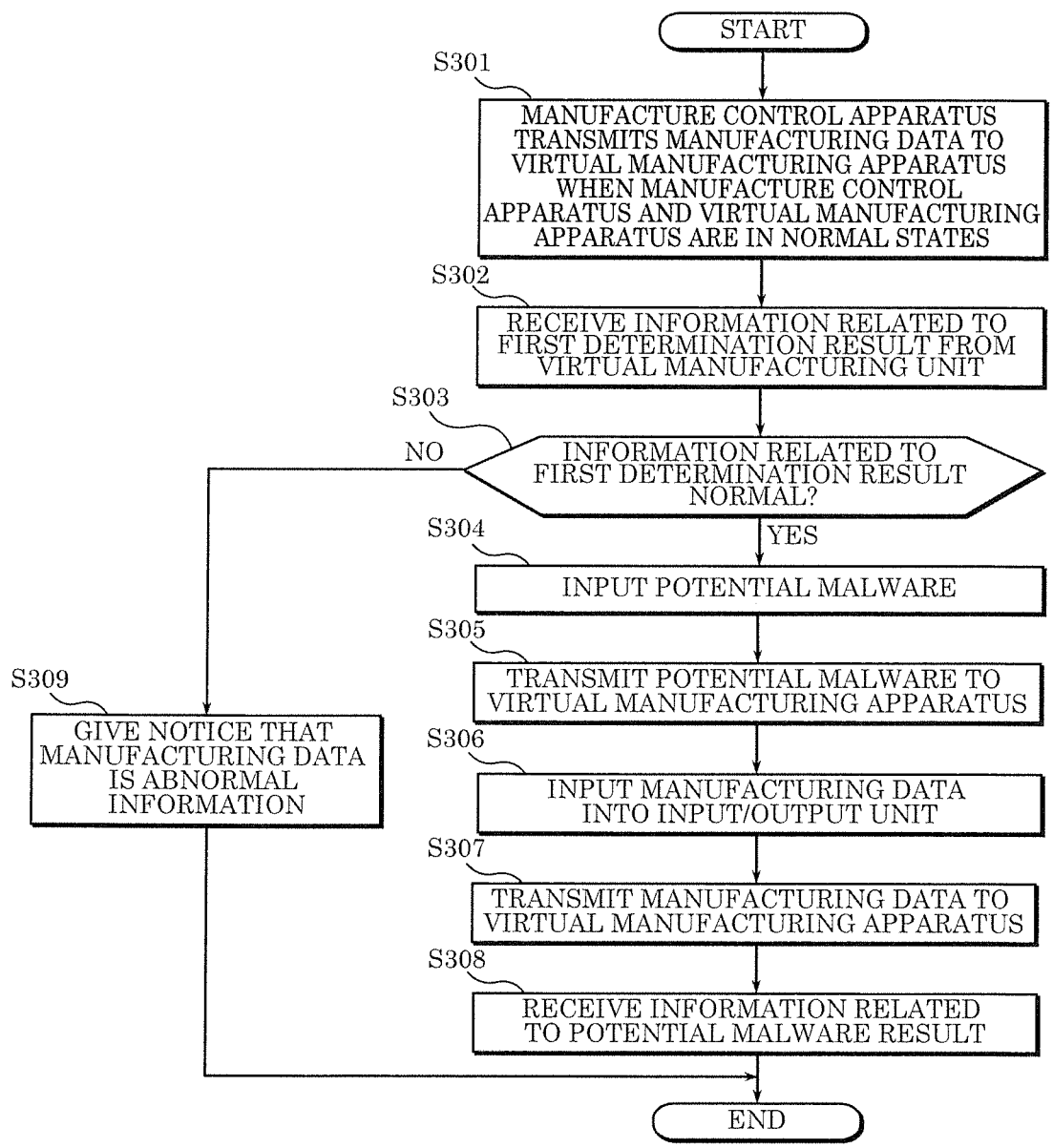
FIG. 11 is a flow chart for a manufacture control apparatus in the malware detection system according to Embodiment 2.

FIG. 11 is a flow chart for manufacture control apparatus 20 in malware detection system 300 according to Embodiment 2. FIG. 12 is a flow chart for virtual manufacturing apparatus 30 in malware detection system 300 according to Embodiment 2. FIG. 13 is a flow chart for malware determination apparatus 20 in malware detection system 300 according to Embodiment 2.

First, as illustrated in FIG. 11, in malware detection system 300, in a normal state in which manufacture control apparatus 20 and virtual manufacturing apparatus 30 are not infected with malware, manufacture control apparatus 20 transmits manufacturing data to virtual manufacturing apparatus 30 (step S301). The manufacturing data input into manufacture control apparatus 20 is stored in storage 24 in manufacture control apparatus 20. Note that in step S301, it is assumed that whether the manufacturing data includes an abnormality or not is unknown.

Figure 12:
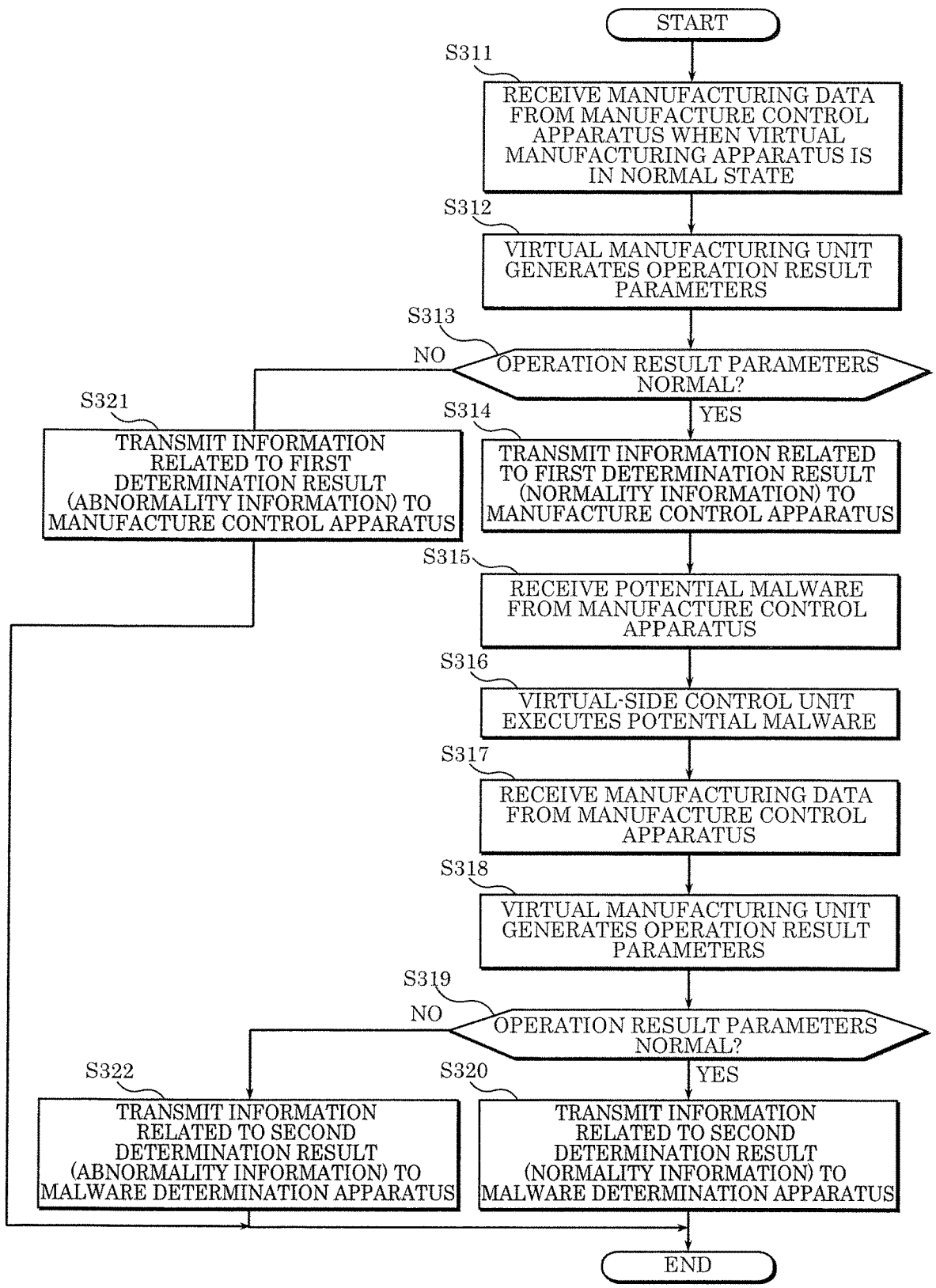
FIG. 12 is a flow chart for a virtual manufacturing apparatus in the malware detection system according to Embodiment 2.

Next, as illustrated in FIG. 12, virtual manufacturing apparatus 30, which is in a normal state, receives the manufacturing data from manufacture control apparatus 20 in the normal state via communication unit 35 in virtual manufacturing apparatus 30 (step S311).

Next, virtual manufacturing apparatus 30 causes virtual manufacturing unit 32 to virtually manufacture a product based on the manufacturing data. In other words, virtual-side control unit 31 causes virtual manufacturing unit 32 to generate operation result parameters (step S312). Step S312 is performed in order to determine whether the manufacturing data is normal or not before execution of the potential malware in step S316 (to be described later). Virtual-side control unit 31 stores the generated operation result parameters in storage 34.

Next, virtual manufacturing unit 32 transmits the operation result parameters to abnormality determination unit 33 in virtual manufacturing apparatus 30. Then, abnormality determination unit 33 determines whether the operation result parameters are normal or not (step S313). When the operation result parameters are determined to be normal (yes in step S313), abnormality determination unit 33 generates information (i.e., normality information) related to a first determination result associated with the operation result parameters. Virtual manufacturing unit 32 transmits the normality information indicating that the information related to the first determination result (operation result parameters) is normal to manufacture control apparatus 20 via communication unit 35 (step S314). Information related to the first determination result is included in information related to the determination result.

On the other hand, when the operation result parameters are determined to include an abnormality (no in step S313), abnormality determination unit 33 generates information (i.e., abnormality information) related to a first determination result associated with the operation result parameters. Virtual manufacturing unit 32 transmits the abnormality information indicating that the information related to the first determination result (operation result parameters) includes an abnormality to manufacture control apparatus 20 via communication unit 35 (step S321). The flow of these processes in virtual manufacturing apparatus 30 ends, and processing proceeds to the flow of processes for manufacture control apparatus 20 in FIG. 11. Note that in steps S314 and S321, the operation result parameters generated by virtual manufacturing unit 32 may be transmitted to manufacture control apparatus 20. Moreover, manufacture control apparatus 20 may store the received operation result parameters in storage 24.

Next, as illustrated in FIG. 11, manufacture control apparatus 20 receives the information related to the first determination result from virtual manufacturing apparatus 30 (step S302).

Next, manufacture control apparatus 20 determines whether the information related to the first determination result received from virtual manufacturing apparatus 30 is normal or not (step S303). When manufacture control apparatus 20 receives the normality information from virtual manufacturing apparatus 30 (yes in step S303), processing proceeds to step S304.

On the other hand, when manufacture control apparatus 20 receives the abnormality information from virtual manufacturing apparatus 30 (no in step S303), control unit 21 in manufacture control apparatus 20 gives notice that the manufacturing data is abnormal information (step S309). In such cases, whether to generate the manufacturing data again or no may be determined, and the apparatus may be determined to be infected with malware. Then, the flow of processes in manufacture control apparatus 20 ends.

Next, potential malware is input into manufacture control apparatus 20 from input/output unit 26 (step S304). Note that the input of potential malware is not limited to an input from input/output unit 26; potential malware may be input from over a network.

Next, control unit 21 in manufacture control apparatus 20 transmits the potential malware to virtual manufacturing apparatus 30 via communication unit 25 in manufacture control apparatus 20 (step S305).

Next, as illustrated in FIG. 12, virtual manufacturing apparatus 30 receives the potential malware from manufacture control apparatus 20 (step S315).

Next, virtual-side control unit 31 executes the potential malware (step S316). The potential malware has, for example, an exe file format. Execution of the potential malware means applying a patch to an initial program. Although virtual manufacturing apparatus 30 is exemplified as being infected in this embodiment, at least one of manufacture control apparatus 20 and virtual manufacturing apparatus 30 may be infected.

Moreover, as illustrated in FIG. 11, manufacturing data is input into manufacture control apparatus 20 from input/output unit 26 (step S306).

Next, manufacture control apparatus 20 transmits the manufacturing data to virtual manufacturing apparatus 30 (step S307).

Next, as illustrated in FIG. 12, virtual manufacturing apparatus 30 receives the manufacturing data (step S317). Virtual-side control unit 31 in virtual manufacturing apparatus 30 causes virtual manufacturing unit 32 to virtually manufacture a product based on the manufacturing data. In other words, virtual-side control unit 31 causes virtual manufacturing unit 32 to generate operation result parameters (one example of the virtual manufacture step (step S318)). In other words, in the virtual manufacture step, virtual manufacturing apparatus 30 virtually manufactures a product via simulation based on product manufacturing data. Virtual-side control unit 31 stores the generated operation result parameters in storage 34. Note that information related to manufacturing processes, which forms part of the operation result parameters, may be transmitted successively.

Next, virtual manufacturing unit 32 transmits the operation result parameters to abnormality determination unit 33 in virtual manufacturing apparatus 30. Then, abnormality determination unit 33 determines whether the operation result parameters are normal or not (step S319). When the operation result parameters are determined to be normal (yes in step S319), abnormality determination unit 33 generates information (i.e., normality information) related to a second determination result associated with the operation result parameters. Virtual manufacturing unit 32 transmits the normality information indicating that the information related to the second determination result is normal to malware determination apparatus 50 via communication unit 35 (step S320). Then, the flow of these processes in virtual manufacturing apparatus 30 ends, and processing proceeds to the flow of processes for malware determination apparatus 50 in FIG. 13. Information related to the second determination result is included in information related to the determination result, and is different from the information related to the first determination result.

On the other hand, when the operation result parameters are determined to include an abnormality (no in step S319), abnormality determination unit 33 generates information (i.e., abnormality information) related to a second determination result associated with the operation result parameters. Virtual manufacturing unit 32 transmits the abnormality information indicating that the information related to the second determination result is abnormal to malware determination apparatus 50 via communication unit 35 (step S322). Then, the flow of these processes in virtual manufacturing apparatus 30 ends, and processing proceeds to the flow of processes for malware determination apparatus 50 in FIG. 13.

Figure 13:
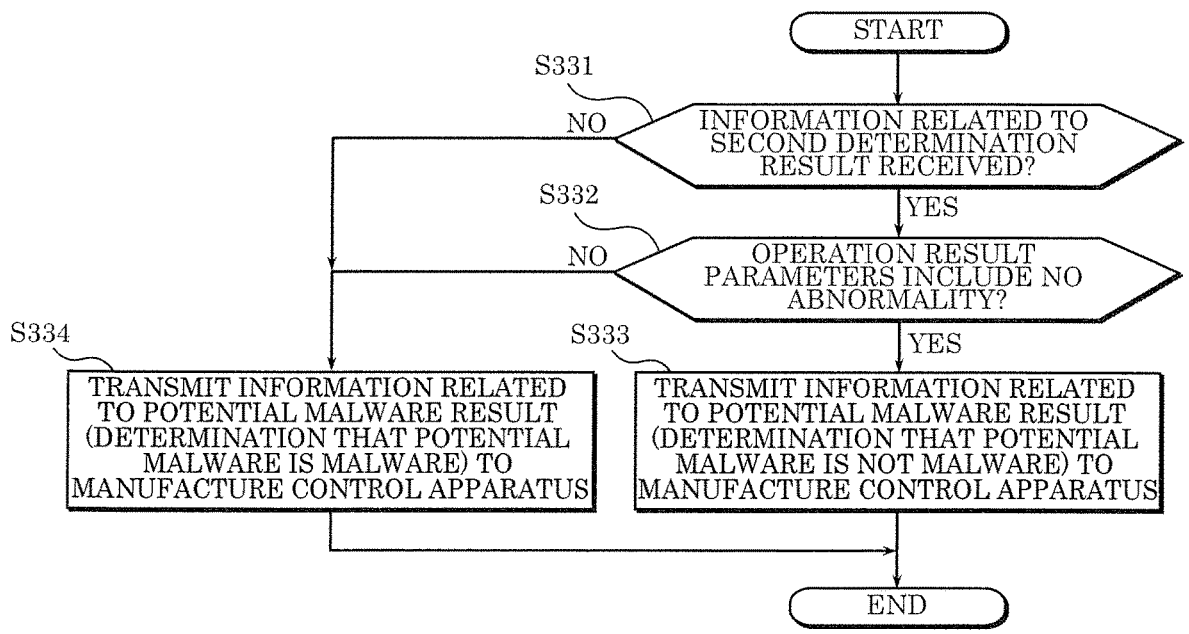
FIG. 13 is a flow chart for a malware determination apparatus in the malware detection system according to Embodiment 2.

Next, as illustrated in FIG. 13, malware determination apparatus 50 determines whether the information related to the second determination result (i.e., the normality information or abnormality information) has been received from virtual manufacturing apparatus 30 or not (step S331).

If malware determination apparatus 50 has not received the information related to the second determination result (i.e., the normality information or abnormality information) from virtual manufacturing apparatus 30, malware determination apparatus 50 may determine that a malfunction has occurred, such as a hang up in the process for virtually manufacturing a product based on the manufacturing data, resulting in an inability to generate operation result parameters. Accordingly, when malware determination apparatus 50 does not receive information related to the second determination result (i.e., normality information or abnormality information) from virtual manufacturing apparatus 30 (no in step S331), malware determination apparatus 50 transmits information related to the result of the potential malware, i.e., information related to the determination that the potential malware is malware, to manufacture control apparatus 20 (step S334). Then, the flow of processes in malware determination apparatus 50 ends.

On the other hand, when malware determination apparatus 50 receives information related to the second determination result (i.e., normality information or abnormality information) from virtual manufacturing apparatus 30 (yes in step S331), malware determination apparatus 50 determines that operation result parameters have been generated.

Next, malware determination apparatus 50 determines whether the abnormality information has been received from virtual manufacturing apparatus 30 or not (one example of the malware determination step (step S332)). When malware determination apparatus 50 receives the abnormality information from virtual manufacturing apparatus 30 (no in step S332), processing proceeds to step S334. Note that in the malware determination step, in a state in which at least one of virtual manufacturing apparatus 30 and manufacture control apparatus 20 that transmits manufacturing data to virtual manufacturing apparatus 30 is infected with potential malware, when an abnormality is detected from the virtual manufacture of a product in the virtual manufacture step, the potential malware is determined to be malware.

On the other hand, when malware determination apparatus 50 receives the abnormality information from virtual manufacturing apparatus 30 (yes in step S332), malware determination apparatus 50 transmits information related to the result of the potential malware, i.e., information indicating the determination that the potential malware is not malware, to manufacture control apparatus 20 (step S333). Then, the flow of processes in malware determination apparatus 50 ends.

Next, manufacture control apparatus 20 receives the information related to the result of the potential malware from malware determination apparatus 50 (step S308). Then, the flow of processes in manufacture control apparatus 20 ends.

Note that when the potential malware is not malware, control unit 21 in manufacture control apparatus 20 may transmit the manufacturing data to physical manufacturing apparatus 40. Then, the manufacturing unit in physical manufacturing apparatus 40 may manufacture the product based on the manufacturing data and generate operation result parameters based on the manufacturing data. Then, the sequence of processes in malware detection system 300 ends.

In this way, in malware detection system 300, by malware determination apparatus 50 determining whether the potential malware is malware or not, it is possible to detect malware. Note that the flow charts illustrated in FIG. 11 through FIG. 13 are not implemented only once; after the first flow of processes is implemented, a new flow of processes can be performed.

Next, an example of operations performed by malware detection system 300 when the manufacturing data is normal will be described with reference to FIG. 14.

Figure 14:
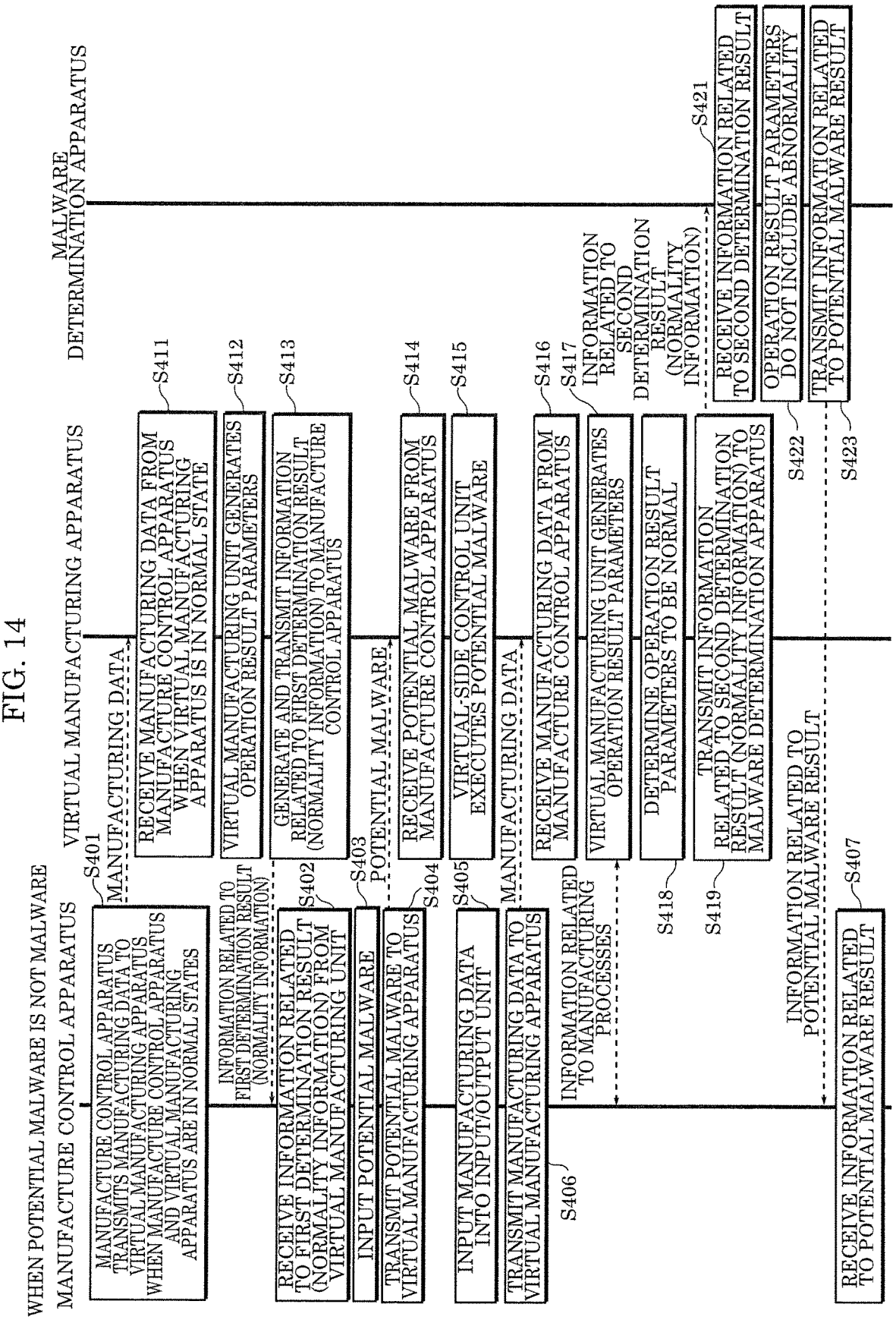
FIG. 14 is a sequence diagram of processes performed in the malware detection system according to Embodiment 2 when the potential malware is not malware.

FIG. 14 is a sequence diagram of processes performed in malware detection system 300 according to Embodiment 2 when the potential malware is not malware.

First, as illustrated in FIG. 14, in malware detection system 300, in a normal state in which manufacture control apparatus 20 and virtual manufacturing apparatus 30 are not infected with malware, manufacture control apparatus 20 transmits manufacturing data to virtual manufacturing apparatus 30 (step S401).

Next, virtual manufacturing apparatus 30, which is in a normal state, receives the manufacturing data from manufacture control apparatus 20, which is in the normal state, via communication unit 35 in virtual manufacturing apparatus 30 (step S411). Note that in step S411, it is assumed that the manufacturing data is normal.

Next, virtual manufacturing apparatus 30 causes virtual manufacturing unit 32 to generate operation result parameters based on the normal manufacturing data (step S412).

Next, abnormality determination unit 33 determines the operation result parameters to be normal since they are based on normal manufacturing data, and generates information related to the first determination result (i.e., normality information) associated with the operation result parameters (step S413). Virtual-side control unit 31 stores the generated normal operation result parameters and normality information in storage 34. Virtual manufacturing unit 32 then transmits the normality information indicating that the operation result parameters are normal to manufacture control apparatus 20 via communication unit 35 (step S413). Note that in step S413, the operation result parameters generated by virtual manufacturing unit 32 may be transmitted to manufacture control apparatus 20. Moreover, manufacture control apparatus 20 may store the received operation result parameters in storage 24.

Next, manufacture control apparatus 20 receives the information related to the first determination result (i.e., the normality information) from virtual manufacturing apparatus 30 (step S402).

Next, potential malware is input into manufacture control apparatus 20 from input/output unit 26 (step S403).

Next, control unit 21 in manufacture control apparatus 20 transmits the potential malware to virtual manufacturing apparatus 30 via communication unit 25 in manufacture control apparatus 20 (step S404).

Next, virtual manufacturing apparatus 30 receives the potential malware from manufacture control apparatus 20 (step S414).

Next, virtual-side control unit 31 executes the potential malware (step S415).

Moreover, manufacturing data is input into manufacture control apparatus 20 from input/output unit 26 (step S405).

Next, manufacture control apparatus 20 transmits the manufacturing data to virtual manufacturing apparatus 30 (step S406).

Next, virtual manufacturing apparatus 30 receives the potential malware from the manufacturing data (step S416).

Next, virtual-side control unit 31 in virtual manufacturing apparatus 30 causes virtual manufacturing unit 32 to generate operation result parameters based on the manufacturing data (one example of the virtual manufacture step (step S417)). Note that virtual manufacturing apparatus 30 transmits information related to manufacturing processes to manufacture control apparatus 20, and receives control information from manufacture control apparatus 20. Virtual-side control unit 31 stores the generated operation result parameters in storage 34.

Next, abnormality determination unit 33 determines whether the operation result parameters are normal or not (step S418). Abnormality determination unit 33 generates the normality information associated with the operation result parameters. Virtual manufacturing unit 32 transmits the normality information indicating that the operation result parameters are normal to malware determination apparatus 50 via communication unit 35 (step S419).

Next, malware determination apparatus 50 receives information related to the second determination result (i.e., the normality information) from virtual manufacturing apparatus 30 (step S421).

Next, malware determination apparatus 50 determines there to be no abnormality in the operation result parameters since the information related to the second determination result from virtual manufacturing apparatus 30 is the normality information (step S422).

Next, malware determination apparatus 50 transmits information related to the result of the potential malware, i.e., information indicating the determination that the potential malware is not malware, to manufacture control apparatus 20 (step S423).

Next, manufacture control apparatus 20 receives the information related to the result of the potential malware from malware determination apparatus 50 (step S407). Then, the flow of processes in manufacture control apparatus 20 ends. In this way, in malware detection system 300, it is possible to detect malware.

Next, an example of operations performed by malware detection system 300 when the manufacturing data includes an abnormality will be described with reference to FIG. 15.

Figure 15:
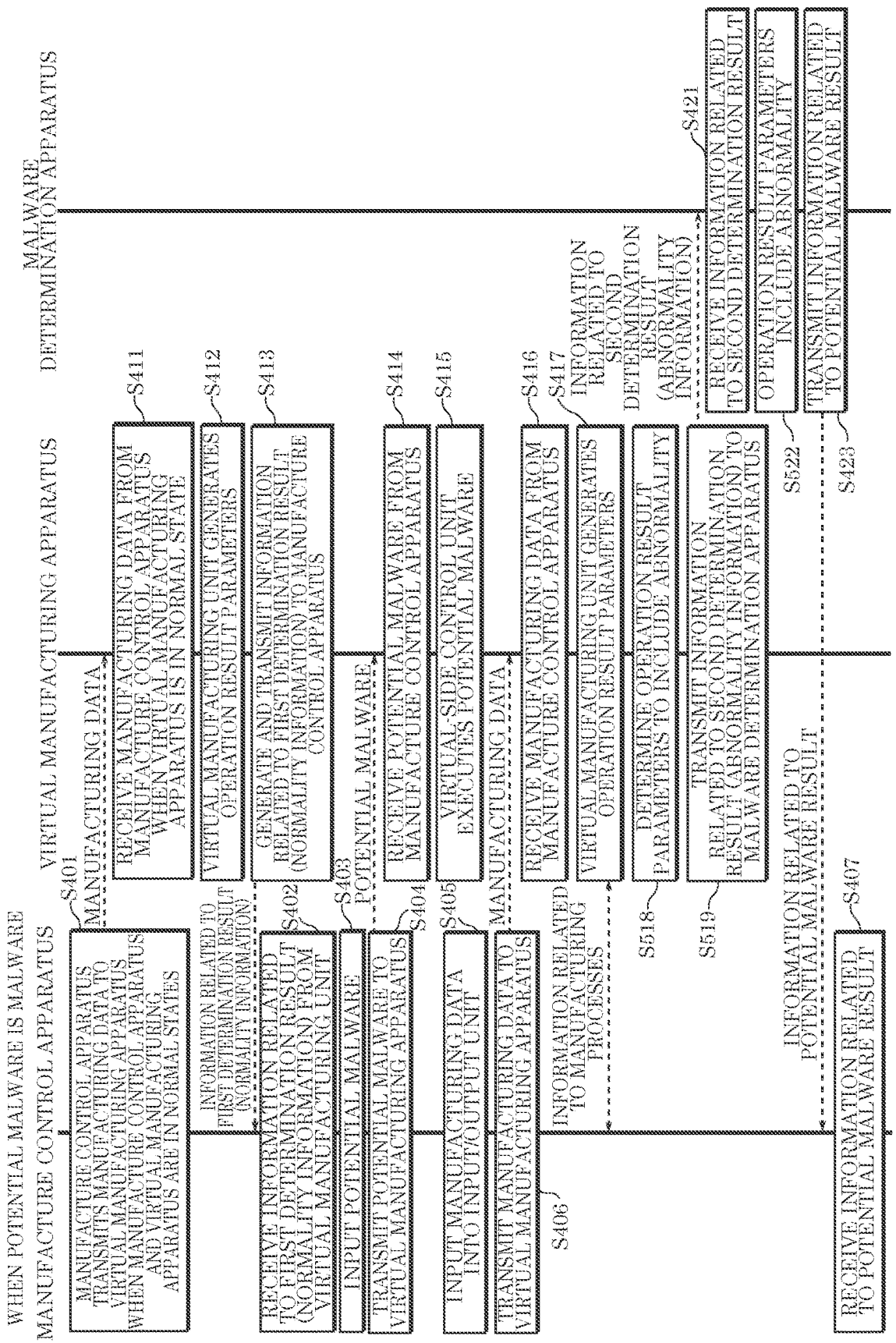
FIG. 15 is a sequence diagram of processes performed in the malware detection system according to Embodiment 2 when the potential malware is malware.

FIG. 15 is a sequence diagram of processes performed in malware detection system 300 according to Embodiment 2 when the potential malware is malware.

As illustrated in FIG. 15, in malware detection system 300, the same processes as steps S401 through S406 and steps S411 through S417 illustrated in FIG. 14 are performed. In FIG. 15, since the potential malware is malware, abnormality determination unit 33 determines the operation result parameters to include an abnormality (step S518). Abnormality determination unit 33 generates the abnormality information associated with the operation result parameters. Virtual manufacturing unit 32 transmits the abnormality information indicating that the operation result parameters include an abnormality to malware determination apparatus 50 via communication unit 35 (step S519).

Next, the same process as the process in step S421 in FIG. 14 is performed, and malware determination apparatus 50 determines there to be an abnormality in the operation result parameters since the information related to the second determination result from virtual manufacturing apparatus 30 is the abnormality information (step S522).

Next, the same processes as the processes in steps S423 and S407 in FIG. 14 are performed. Then, the flow of processes ends. Here, for example, control unit 21 in manufacture control apparatus 20 may give notice that the potential malware is malware.

Operational Advantages

Next, operational advantages of malware detection system 300 and the malware detection method according to the present embodiment will be described.

As described above, in malware detection system 300 according to this embodiment, malware that causes a malfunction in physical manufacturing apparatus 40 that physically manufactures a product is detected. malware detection system 300 includes: a product manufacturing system; and malware determination apparatus 50 that determines potential malware to be malware when, in a state in which at least one of virtual manufacturing apparatus 30 and manufacture control apparatus 20 is infected with the potential malware, an abnormality is detected from the virtual manufacture of the product by virtual manufacturing apparatus 30 based on the manufacturing data.

With this, since the virtual manufacturing apparatus 30 is caused to manufacture a virtual product based on manufacturing data (virtual manufacture step) in a state in which at least one of virtual manufacturing apparatus 30 and manufacture control apparatus 20 is infected with potential malware, if the potential malware is malware, malware determination apparatus 50 can detect an abnormality in the product virtually manufactured by virtual manufacturing apparatus 30 (i.e., in the operation result parameters).

Accordingly, in malware detection system 300, it is possible to accurately detect malware without affecting product manufacturing.

In a malware detection method according to the present embodiment, malware that causes a malfunction in physical manufacturing apparatus 40 that physically manufactures a product is detected. The method includes: virtually manufacturing the product by simulation via virtual manufacturing apparatus 30, based on manufacturing data on the product; and determining potential malware to be malware when an abnormality is detected from the virtual manufacturing of the product in a state in which at least one of virtual manufacturing apparatus 30 and manufacture control apparatus 20 that transmits the manufacturing data to virtual manufacturing apparatus 30 is infected with the potential malware.

In this malware detection method as well, it is possible to achieve the same operational advantages as malware detection system 300.

Moreover, in malware detection system 300 according to this embodiment, virtual manufacturing apparatus 30 includes: virtual manufacturing unit 32 that virtually manufactures the product based on the manufacturing data; and virtual-side control unit 31 that controls operation of virtual manufacturing unit 32 based on the manufacturing data. Abnormality determination unit 33 is provided in virtual manufacturing apparatus 30.

With this, after virtual manufacturing unit 32 virtually manufactures the product, abnormality determination unit 33 determines whether there is an abnormality in the virtual manufacture of the product by virtual manufacturing unit 32. Accordingly, just like with malware detection system 300, it possible to prevent malfunctions in physical manufacturing apparatus 40, such as the manufacture of defective goods, the halting of manufacturing equipment, and damage of equipment based on abnormal manufacturing data.

Moreover, in malware detection system 300 according to this embodiment, virtual manufacturing unit 32 generates an operation result parameter related to the virtual manufacture of the product, and abnormality determination unit 33 determines whether there is an abnormality in the virtual manufacture of the product based on the operation result parameter.

With this, since abnormality determination unit 33 determines whether there is an abnormality or not based on operation result parameters received from virtual manufacturing unit 32, it is easy to identify the part of the manufacturing data, based on which virtual manufacturing unit 32 virtually manufactured the product, that is abnormal, by analyzing the operation result parameters.

Moreover, in malware detection system 300 according to this embodiment, virtual manufacturing unit 32 is a virtual component mounting apparatus that manufactures the product, and the operation result parameter includes at least one of: coordinates at which the component mounting apparatus is to mount a component on a substrate; an orientation in which the component mounting apparatus is to mount the component on the substrate: a type of the component to be mounted by the component mounting apparatus and a type of the substrate; a rotational speed of the component mounting apparatus; a velocity of the component mounting apparatus; a voltage of the component mounting apparatus; a current of the component mounting apparatus; and a temperature of the component mounting apparatus.

With this, since abnormality determination unit 33 determines whether there is an abnormality or not based on specific operation result parameters, it is easy to identify the part of the manufacturing data, based on which virtual manufacturing unit 32 virtually manufactured the product, that is abnormal, by analyzing the operation result parameters.

Moreover, in malware detection system 300 according to this embodiment, abnormality determination unit 33 determines whether there is an abnormality in the manufacture of the product based on communication information between virtual-side control unit 31 and virtual manufacturing unit 32.

With this, since abnormality determination unit 33 reads control of operations transmitted to virtual manufacturing unit 32 by virtual-side control unit 31 from communication information between virtual-side control unit 31 and virtual manufacturing unit 32 in virtual manufacturing apparatus 30, it is possible to determine whether there is an abnormality in the operation result parameters early on.

Variation of Embodiment 2

Next, malware detection system 300a according to this variation will be described with reference to FIG. 16.

Figure 16:
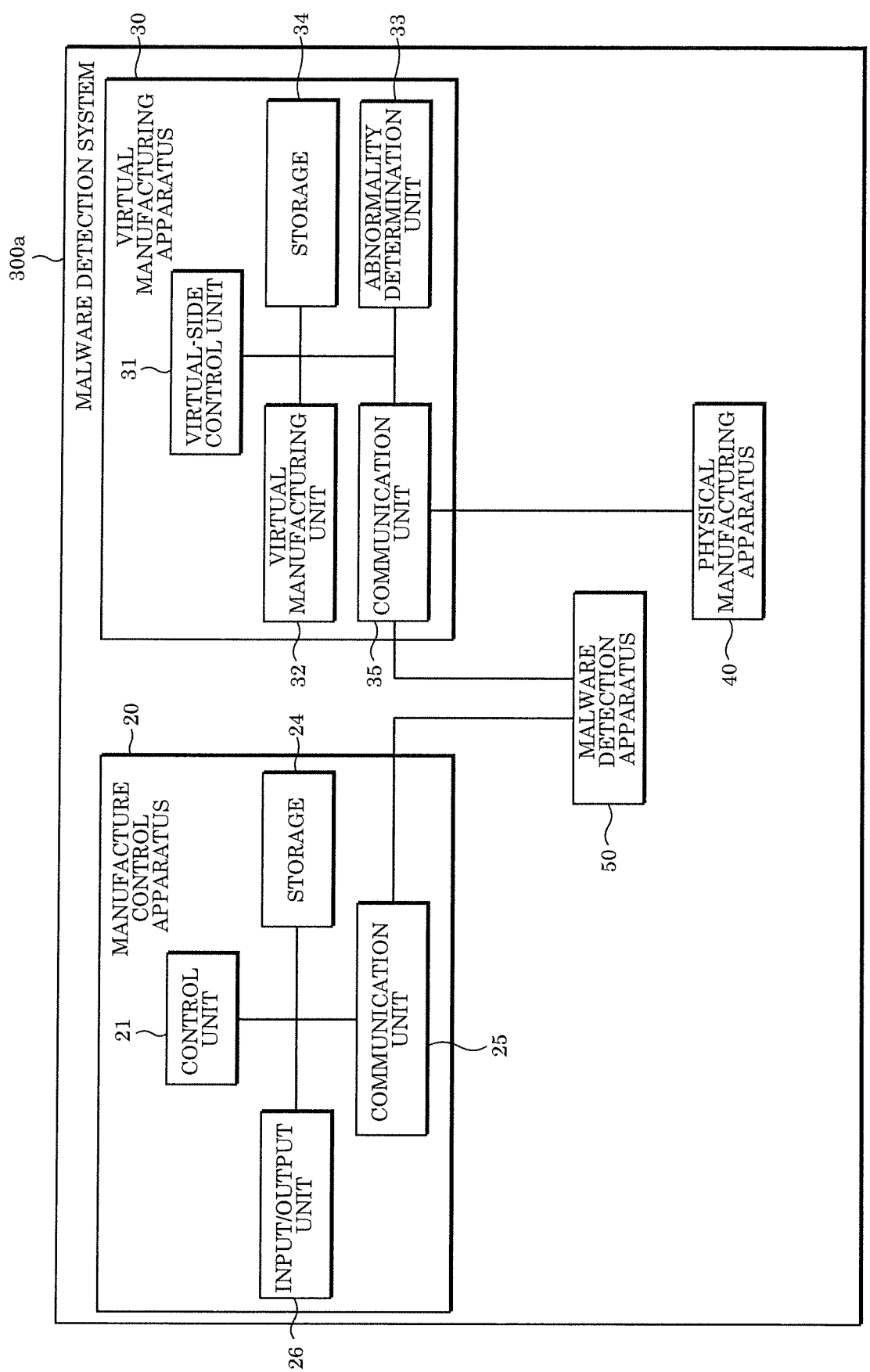
FIG. 16 is a block diagram of a malware detection system according to a variation of Embodiment 2.

FIG. 16 is a block diagram of malware detection system 300a according to a variation of Embodiment 2.

In Embodiment 2, manufacture control apparatus 20, virtual manufacturing apparatus 30, physical manufacturing apparatus 40, and malware determination apparatus 50 are communicably connected to one another, but in this variation, manufacture control apparatus 20, malware determination apparatus 50, virtual manufacturing apparatus 30, and physical manufacturing apparatus 40 are connected in series in this order.

When other configurations are not described in this variation, it is because they are the same as in the embodiment. Moreover, like elements share like reference signs. Detailed description of such elements will be omitted.

Manufacture control apparatus 20, malware determination apparatus 50, virtual manufacturing apparatus 30, and physical manufacturing apparatus 40 are connected together in series in this order. Manufacture control apparatus 20 and physical manufacturing apparatus 40 cannot directly communicate; manufacture control apparatus 20 and physical manufacturing apparatus 40 are communicably connected via malware determination apparatus 50 and virtual manufacturing apparatus 30.

Moreover, in malware detection system 300a according to this variation, manufacture control apparatus 20, malware determination apparatus 50, virtual manufacturing apparatus 30, and physical manufacturing apparatus 40 are connected together in series in this order.

When manufacture control apparatus 20, malware determination apparatus 50, virtual manufacturing apparatus 30, and physical manufacturing apparatus 40 are communicably connected to one another, for example, control unit 21 in manufacture control apparatus 20 is required to set a transmission destination. Accordingly, when control unit 21 transmits manufacturing data to virtual manufacturing apparatus 30, there is a concern that abnormal manufacturing data may be directly transmitted to physical manufacturing apparatus 40 as the result of some malfunction.

With the configuration according to this variation, manufacture control apparatus 20 transmits the manufacturing data to physical manufacturing apparatus 40 via malware determination apparatus 50 and virtual manufacturing apparatus 30. In other words, malware determination apparatus 50 and virtual manufacturing apparatus 30 physically segments communication between manufacture control apparatus 20 and physical manufacturing apparatus 40. Accordingly, it is unlikely that abnormal manufacturing data will be directly transmitted to physical manufacturing apparatus 40 as the result of a malfunction.

This variation also achieves the other operational advantages achieved by Embodiment 2 as well.

Other Variations, Etc.

Hereinbefore, a product manufacturing system, a malware detection system, a product manufacturing method, and a malware detection method according to the present disclosure have been described based on Embodiments 1 and 2 and variations thereof, but the present disclosure is not limited to Embodiments 1 and 2 and variations thereof.

Figure 17:
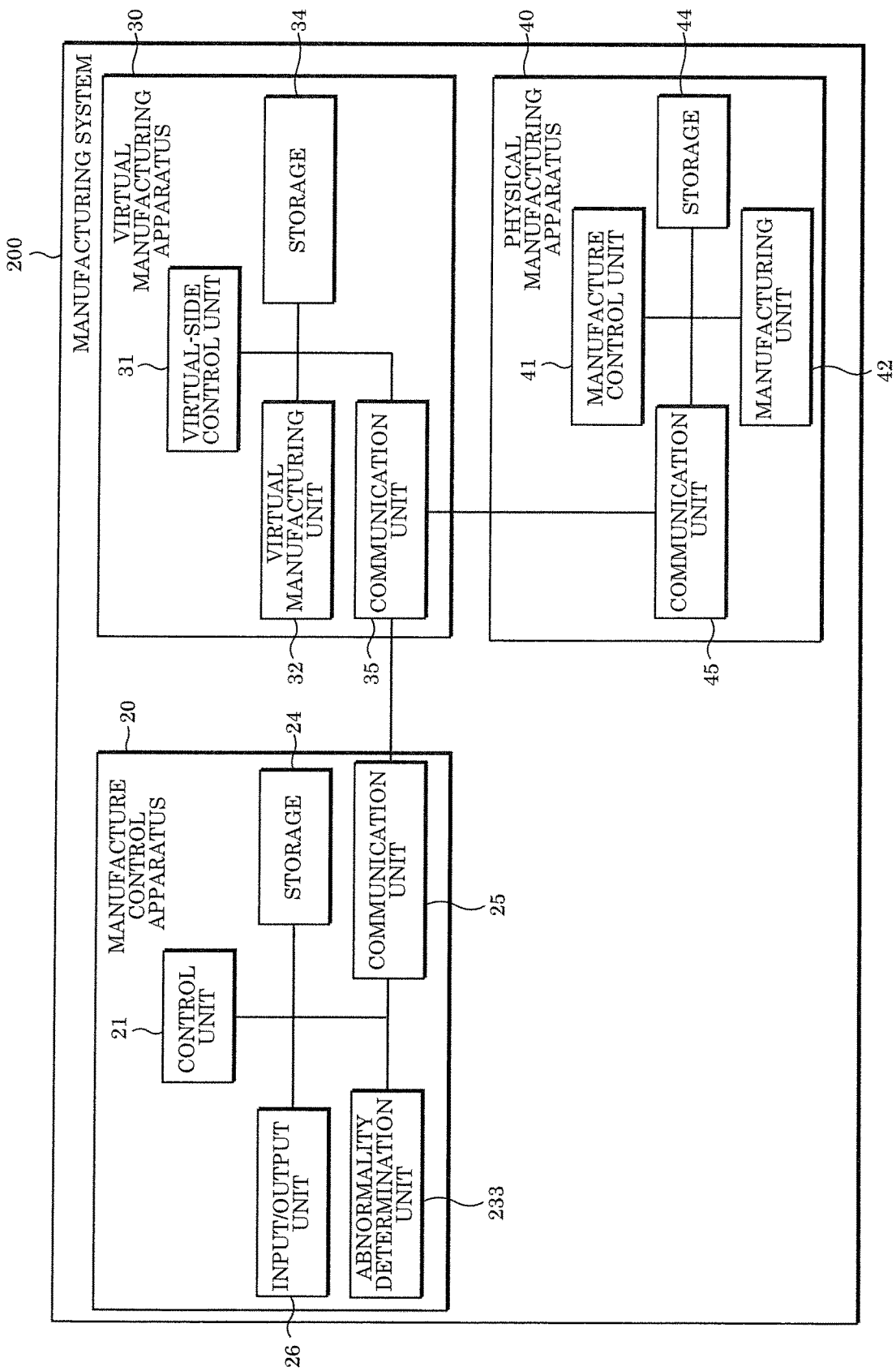
FIG. 17 is a block diagram of a product manufacturing system according to a variation.
Figure 18:
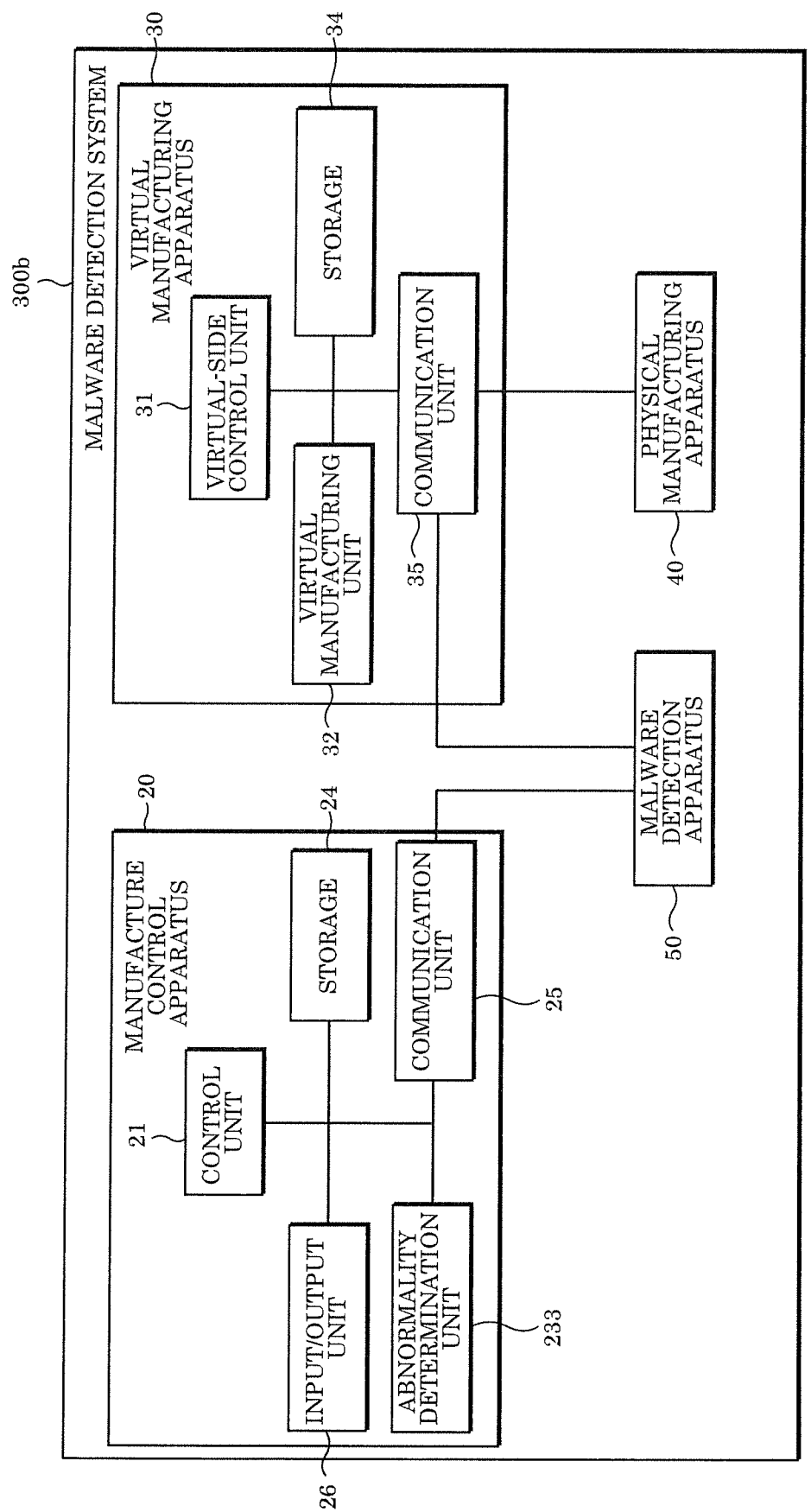
FIG. 18 is a block diagram of a malware detection system according to a variation.

For example, in Embodiments 1 and 2 and the variations thereof, as illustrated in FIG. 17 and FIG. 18, abnormality determination unit 233 may be provided in manufacture control apparatus 20. FIG. 17 is a block diagram of product manufacturing system 200 according to a variation, and FIG. 18 is a block diagram of malware detection system 300b according to a variation. In other words, abnormality determination unit 233 is provided in manufacture control apparatus 20. Abnormality determination unit 233 determines whether there is an abnormality or not based on communication information between manufacture control apparatus 20 and virtual manufacturing apparatus 30. In this case, abnormality determination unit 233 determines whether there is an abnormality or not from communication information between manufacture control apparatus 20 and virtual manufacturing apparatus 30. Moreover, when either manufacturing system 200 or malware detection system 300b is infected with malware, it is conceivable that the malware could cause an abnormality in the manufacturing data. In such cases, it is possible to determine whether either of the apparatuses is infected with malware. Moreover, it is possible to determine whether or not there is an abnormality in both items of the communication information. If it is possible to detect such abnormalities, it possible to prevent malfunctions such as the manufacture of defective goods, the halting of manufacturing equipment, and damage of equipment based on abnormal manufacturing data.

Moreover, in Embodiments 1 and 2 and the variations thereof, the operation result parameters used by the abnormality determination unit are exemplified as being those output by the virtual manufacturing apparatus and the physical manufacturing apparatus, but when information equivalent to the operation result parameters is included in a control signal, it is not necessary for the virtual manufacturing apparatus and the physical manufacturing apparatus to output the operation result parameters; the operation result parameters included in the output from the virtual-side control unit may be used by the abnormality determination unit.

Moreover, in Embodiments 1 and 2 and the variations thereof, the abnormality determination unit may be provided as a separate device independent from the manufacture control apparatus and the virtual manufacturing apparatus.

Moreover, in Embodiments 1 and 2 and the variations thereof, the virtual manufacturing apparatus and the physical manufacturing apparatus may be integrated together as a single apparatus. In such cases, the virtual manufacturing apparatus virtually manufactures the product based on the manufacturing data, and when the manufacturing data is normal, the virtual manufacturing apparatus may directly transmit that manufacturing data to the physical manufacturing apparatus.

Moreover, in Embodiments 1 and 2 and the variations thereof, the manufacture control apparatus and the virtual manufacturing apparatus may be integrated together as a single apparatus.

Moreover, in Embodiment 2 and the variation thereof, the malware detection system includes a physical manufacturing apparatus, but the malware detection system need not include a physical manufacturing apparatus.

Moreover, in Embodiments 1 and 2 and the variations thereof, the elements included in the manufacture control apparatus, the virtual manufacturing apparatus, the physical manufacturing apparatus, and the malware determination apparatus are configured from, specifically, a microprocessor, RAM, ROM, and a hard disk, etc. The RAM, ROM, and hard disk may store a computer program, and the functions of the manufacture control apparatus, the virtual manufacturing apparatus, the physical manufacturing apparatus, and the malware determination apparatus may be executed by the microprocessor performing operations in accordance with the program. Each element in the manufacture control apparatus, the virtual manufacturing apparatus, the physical manufacturing apparatus, and the malware determination apparatus is typically implemented in the form of a large scale integrated (LSI) circuit (also referred to as an IC, system LSI circuit, super LSI circuit, or ultra LSI circuit depending on scale). Each element may be realized as a single chip, and, alternatively, one or more elements or a portion of each of the elements may be integrated as a single chip. Moreover, the method of circuit integration is not limited to LSI. Integration may be realized with a specialized circuit or a general purpose processor. After the LSI circuit is manufactured, a field programmable gate array (FPGA) or a reconfigurable processor capable of reconfiguring the connections and settings of the circuit cells in the large scale integrated circuit may be used. Furthermore, when advancement in semiconductor technology or derivatives of other technologies brings forth a circuit integration technology which replaces LSI, it will be appreciated that such a circuit integration technology may be used to integrate the functional blocks. Application of biotechnology is also a possibility. Still furthermore, each functional block may be realized as software, and, alternatively, may be realized as a combination of an LSI circuit and software. The software may be tamper-proof.

Hereinbefore, one or more aspects of the present disclosure have been described based on Embodiments 1 and 2 and variations thereof, but the present disclosure is not limited to Embodiments 1 and 2 and the variations thereof. Those skilled in the art will readily appreciate that many modifications are possible in the exemplary embodiment without materially departing from the novel teachings and advantages of the present disclosure. Accordingly, all such modifications are intended to be included within one or more aspects of the present disclosure.

INDUSTRIAL APPLICABILITY

The present disclosure is applicable in industrial systems related to, for example, the manufacture of electronic components or the like.

The invention claimed is:

1. A product manufacturing system that manufactures a product, the product manufacturing system comprising:
a manufacture control apparatus configured to hold manufacturing data for manufacturing the product;
a virtual manufacturing apparatus configured to virtually manufacture the product by simulation, based on the manufacturing data on the product held in the manufacture control apparatus;
a physical manufacturing apparatus configured to physically manufacture the product based on the manufacturing data held in the manufacture control apparatus; and
a processor configured to determine whether there is an abnormality in the manufacturing data as a result of the virtual manufacture of the product based on the manufacturing data,
wherein, when the processor determines there to be no abnormality from the virtual manufacture of the product, the physical manufacturing apparatus physically manufactures the product.

2. The product manufacturing system according to claim 1,
wherein the virtual manufacturing apparatus is configured to generate an operation result parameter related to the virtual manufacture of the product, and
the processor is configured to determine whether there is an abnormality in the virtual manufacture of the product based on the operation result parameter.

3. The product manufacturing system according to claim 2,
wherein the virtual manufacturing apparatus is a component mounting apparatus that is virtual and configured to manufacture the product, and
the operation result parameter includes at least one of: coordinates at which the component mounting apparatus is to mount a component on a substrate; an orientation in which the component mounting apparatus is to mount the component on the substrate: a type of the component to be mounted by the component mounting apparatus and a type of the substrate; a rotational speed of the component mounting apparatus; a velocity of the component mounting apparatus; a voltage of the component mounting apparatus; a current of the component mounting apparatus; and a temperature of the component mounting apparatus.

4. The product manufacturing system according to claim 1,
wherein the processor is configured to determine whether there is an abnormality in the manufacture of the product based on communication information from the virtual manufacturing apparatus.

5. The product manufacturing system according to claim 1,
wherein the processor is provided in the manufacture control apparatus, and
the processor is configured to determine whether there is an abnormality based on communication information between the manufacture control apparatus and the virtual manufacturing apparatus.

6. The product manufacturing system according to claim 1,
wherein the manufacture control apparatus, the virtual manufacturing apparatus, and the physical manufacturing apparatus are connected in series in this order.

7. A malware detection system that detects malware that causes a malfunction in the physical manufacturing apparatus that physically manufactures the product, the malware detection system comprising:
the product manufacturing system according to claim 1; and
a malware determination apparatus configured to determine potential malware to be malware when, in a state in which at least one of the virtual manufacturing apparatus and the manufacture control apparatus is infected with the potential malware, an abnormality is detected from the virtual manufacture of the product by the virtual manufacturing apparatus based on the manufacturing data.

8. The malware detection system according to claim 7,
wherein the processor is provided in the virtual manufacturing apparatus.

9. The malware detection system according to claim 8,
wherein the virtual manufacturing apparatus is configured to generate an operation result parameter related to the virtual manufacture of the product, and
the processor is configured to determine whether there is an abnormality in the virtual manufacture of the product based on the operation result parameter.

10. The malware detection system according to claim 9,
wherein the virtual manufacturing apparatus is a component mounting apparatus that is virtual and configured to manufacture the product, and
the operation result parameter includes at least one of: coordinates at which the component mounting apparatus is to mount a component on a substrate; an orientation in which the component mounting apparatus is to mount the component on the substrate: a type of the component to be mounted by the component mounting apparatus and a type of the substrate; a rotational speed of the component mounting apparatus; a velocity of the component mounting apparatus; a voltage of the component mounting apparatus; a current of the component mounting apparatus; and a temperature of the component mounting apparatus.

11. The malware detection system according to claim 8,
wherein the processor is configured to determine whether there is an abnormality in the manufacture of the product based on communication information from the virtual manufacturing apparatus.

12. The malware detection system according to claim 7,
wherein the processor is provided in the manufacture control apparatus, and
the processor is configured to determine whether there is an abnormality based on communication information between the manufacture control apparatus and the virtual manufacturing apparatus.

13. The malware detection system according to claim 7,
wherein the manufacture control apparatus, the malware determination apparatus, the virtual manufacturing apparatus, and the physical manufacturing apparatus are connected in series in this order.

14. A product manufacturing method for manufacturing a product, the method comprising:
virtually manufacturing the product by simulation, based on manufacturing data for manufacturing the product;
determining whether there is an abnormality in the manufacturing data as a result of the virtual manufacturing of the product based on the manufacturing data; and
physically manufacturing the product based on the manufacturing data when the determining determines there to be no abnormality from the virtual manufacturing of the product.

* * * * *